United States Patent
Kondo et al.

(10) Patent No.: US 6,718,299 B1
(45) Date of Patent: Apr. 6, 2004

(54) INFORMATION PROCESSING APPARATUS FOR INTEGRATING A PLURALITY OF FEATURE PARAMETERS

(75) Inventors: Tetsujiro Kondo, Tokyo (JP); Norifumi Yoshiwara, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/478,061

(22) Filed: Jan. 5, 2000

(30) Foreign Application Priority Data

Jan. 7, 1999 (JP) .......................................... 11-001789

(51) Int. Cl.$^7$ ............................................... G01L 19/14
(52) U.S. Cl. ........................................ 704/224; 704/243
(58) Field of Search ................................ 704/224, 243, 704/244, 276, 201

(56) References Cited

U.S. PATENT DOCUMENTS

| | | | |
|---|---|---|---|
| 5,412,738 A | * 5/1995 | Brunelli et al. | 382/115 |
| 5,729,694 A | * 3/1998 | Holzrichter et al. | 704/270 |
| 5,839,103 A | * 11/1998 | Mammone et al. | 704/231 |
| 6,006,175 A | * 12/1999 | Holzrichter | 704/208 |
| 6,125,345 A | * 9/2000 | Modi et al. | 704/232 |

* cited by examiner

Primary Examiner—Doris H. To
Assistant Examiner—Michael N. Opsasnick
(74) Attorney, Agent, or Firm—Frommer Lawrence & Haug LLP; William S. Frommer; Gordon Kessler

(57) ABSTRACT

An information processing apparatus includes a feature parameter detector for detecting feature parameters based on a plurality of input data, a normalizer for normalizing the feature parameters detected by the feature parameter detector while maintaining their feature components, and an integration unit for integrating the feature parameters normalized by the normalizer. In the information processing apparatus, feature parameters from a plurality of input data are normalized based on learning normalization coefficients, and distances from each of the normalized feature parameters and to a normal parameter are calculated. Based on the calculated distances, time-series normalization coefficients for performing speech recognition are determined for the feature parameters. Therefore, optimal normalization coefficients for recognizing the feature parameters at each point of time can be obtained.

17 Claims, 25 Drawing Sheets

INFORMATION PROCESSING APPARATUS FOR INTEGRATING A PLURALITY OF FEATURE PARAMETERS

BACKGROUND OF THE INVENTION

1. Field of the Invention

The present invention relates to information processing apparatuses that integrate a plurality of feature parameters, and in particular, to an information processing apparatus in which, when speech recognition based on speech and on an image of lips observed when the speech was made is performed, the information processing apparatus increases speech recognition performance by integrating audio and image feature parameters so that the parameters can be processed in optimal form.

2. Description of the Related Art

By way of example, speech is recognized by extracting feature parameters from the speech, and comparing the feature parameters with normal parameters (normal patterns) used as a reference.

When speech recognition based on only speech is performed, there is a certain limit to increasing the recognition factor. Accordingly, it is possible that the speech recognition be performed based not only on the speech but also on a captured image of lips of the speaker.

In this case, it is also possible to integrate feature parameters extracted from the speech and feature parameters extracted from the lip image to form so-called "integrated parameters" and to use the integrated parameters to perform speech recognition. The assignee of the present patent application has proposed Japanese Patent Application No. 10-288038 (which was not open to the public when the present patent application was filed) as a type of speech recognition that generates integrated parameters by integrating feature parameters extracted from speech and feature parameters extracted from a lip image and that uses the integrated parameters to perform speech recognition.

With reference to FIGS. 1 to 16, Japanese Patent Application No. 10-288038 is described below.

FIG. 1 shows an example of a speech recognition apparatus that performs speech recognition based on integrated parameters obtained by integrating feature parameters based on a plurality of input data.

In addition to speed data (as a speech from a user) to be recognized, image data obtained by capturing an image of the user's lips when the user spoke, noise data on noise in an environment where the user spoke, and data useful in recognizing the user's speech (speech), such as a signal in accordance with the operation of an input unit for inputting a place where the user speaks in the case where the speech recognition apparatus is provided with the input unit, are sequentially input in time series to the speech recognition apparatus. The speech recognition apparatus takes these types of data into consideration, as required, when performing speech recognition.

Specifically, the speech data, the lip-image data, the noise data, and other data, which are in digital form, are input to a parameter unit 1. The parameter unit 1 includes signal processors $11_1$ to $11_N$ (where N represents the number of data signals input to the parameter unit 1). The speech data, the lip-image data, the noise data, and other data are processed by the signal processors $11_1$ to $11_N$ corresponding thereto, whereby extraction of feature parameters representing each type of data, etc., is performed. The feature parameters extracted by the parameter unit 1 are supplied to an integrated parameter generating unit 2.

In the parameter unit 1 shown in FIG. 1, the signal processor (lip-signal processor) $11_1$ processes the lip-image data, the signal processors (audio-signal processors) $11_2$ to $11_{N-1}$ process the speech data, and the signal processor (audio-signal processor) $11_N$ processes the noise data, etc. The feature parameters of the speech (sound) data such as the speech data and the noise data include, for example, linear prediction coefficients, cepstrum coefficients, power, line spectrum pairs, and zero cross. The feature parameters of the lip-image data include, for example, parameters (e.g., the longer diameter and shorter diameter of an ellipse) defining an ellipse approximating the shape of the lips.

The integrated parameter generating unit 2 includes an intermedia normalizer 21 and an integrated parameter generator 22, and generates integrated parameters by integrating the feature parameters of the signals from the parameter unit 1.

In other words, the intermedia normalizer 21 normalizes the feature parameters of the signals from the parameter unit 1 so that they can processed having the same weight, and outputs the normalized parameters to the integrated parameter generator 22. The integrated parameter generator 22 integrates (combines) the normalized feature parameters of the signals from the intermedia normalizer 21, thereby generating integrated parameters, and outputs the integrated parameters to the matching unit 3.

The matching unit 3 compares the integrated feature parameters and normal patterns (a model to be recognized), and outputs the matching results to a determining unit 4. In other words, the matching unit 3 includes a distance-transition matching unit 31 and a spatial distribution matching unit 32. The distance-transition matching unit 31 uses a distance-transition model (described below) to perform the matching of the integrated feature parameters by using a distance-transition method (described below), and outputs the matching results to the determining unit 4. The spatial distribution matching unit 32 performs the matching of the integrated feature parameters by using a spatial distribution method (described below), and outputs the matching results to the determining unit 4.

The determining unit 4 recognizes the user's speech (sound), based on outputs from the matching unit 3, i.e., the matching results from the distance-transition matching unit 31 and the spatial distribution matching unit 32, and outputs the result of recognition, e.g., a word. Accordingly, in the determining unit 4, what is processed by speech recognition is a word. In addition, for example, a phoneme, etc., can be processed by speech recognition.

With reference to the flowchart shown in FIG. 2, processing by the speech recognition apparatus (shown in FIG. 1) is described below.

When the speech data, the lip-image data, the noise data, etc., are input to the speech recognition apparatus, they are supplied to the parameter unit 1.

In step S1, the parameter unit 1 extracts feature parameters from the supplied data, and outputs them to the integrated parameter generating unit 2.

In step S2, the intermedia normalizer 21 (in the integrated parameter generating unit 2) normalizes the feature parameters from the parameter unit 1, and outputs the normalized feature parameters to the integrated parameter generator 22.

In step S3, the integrated parameter generator 22 generates integrated feature parameters by integrating the normalized feature parameters from the intermedia normalizer 21. The integrated feature parameters are supplied to the distance-transition matching unit 31 and the spatial distribution matching unit 32 in the matching unit 3.

In step S4, the distance-transition matching unit 31 performs the matching of the integrated feature parameters by using the distance-transition method, and the spatial distribution matching unit 32 performs the matching of the integrated feature parameters by using the spatial distribution method. Both matching results are supplied to the determining unit 4.

In step S5, based on the matching results from the matching unit 3, the determining unit 4 recognizes the speech data (the user's speech). After outputting the result of (speech) recognition, the determining unit 4 terminates its process.

As described above, the intermedia normalizer 21 (shown in FIG. 1) normalizes the feature parameters of the signals from the parameter unit 1 so that they can be processed having the same weight. The normalization is performed by multiplying each feature parameter by a normalization coefficient. This normalization coefficient is found by performing learning (normalization-coefficient learning process). FIG. 3 shows an example of a learning apparatus for performing the learning.

For brevity of description, a type of learning is described below that finds normalization coefficients for setting the feature parameters of the speech and the image as two different media (e.g., feature parameters of speech and feature parameters of lips observed when the speech was made) to have the same weight.

In FIG. 3, image feature parameter $P_{i,j}$ and speech feature parameter $V_{i,j}$, which are code-vector learning parameters (codebook-creating data) for creating a codebook for use in vector quantization, are supplied to a tentative normalizer 51. The tentative normalizer 51 tentatively normalizes image feature parameter $P_{i,j}$ and speech feature parameter $V_{i,j}$ by using normalization coefficients from a normalization coefficient controller 55, and supplies the normalized feature parameters to a codebook creator 52. In other words, in order to use the weight of image feature parameter $P_{i,j}$ as a reference and to set the weight of speech feature parameter $V_{i,j}$ to equal the reference, speech feature parameter $V_{i,j}$ is multiplied by normalization coefficient a from the normalization coefficient controller 55. Accordingly, it can be considered that image feature parameter $P_{i,j}$ is multiplied by 1 as normalization coefficient α.

In FIG. 3, suffix "i" indicating the row of feature parameter $P_{i,j}$ or $V_{i,j}$ represents a time (frame) at which the feature parameter $P_{i,j}$ or $V_{i,j}$ was extracted, and suffix "j" indicating the column of feature parameter $P_{i,j}$ or $V_{i,j}$ represents the order (dimensions) of the feature parameter $P_{i,j}$ or $V_{i,j}$. Therefore, $(P_{i,j}, P_{i,2}, \ldots, P_{i,L}, V_{i,1}, V_{i,2}, \ldots, V_{i,M})$ are feature parameters (feature vectors) at time i. Expression $P^{(k)}_{i,j}$ formed by adding a suffix in parentheses to image feature parameter $P_{i,j}$ represents a feature parameter generated from different learning data if "k" differs. This also applies to the suffix (k) of expression $V^{(k)}_{i,j}$.

The codebook creator 52 creates a codebook for use in vector quantization by a vector quantizer 54, using code-vector learning parameters $P_{i,j}$ and $V_{i,j}$, and supplies it to the vector quantizer 54.

In the codebook creator 52, the codebook is created in accordance with, e.g., the LBG (Linde, Buzo, Gray) algorithm. However, another type of algorithm other than the LBG algorithm may be employed.

The LBG algorithm is so-called "batch learning algorithm", and locally converges code vectors (representative vectors) constituting the codebook in optimal positions by repeatedly performing Voronois division that optimally divides a feature parameter space in accordance with the distance between a feature parameter as a learning sample (learning data) and each code vector (a proper initial value is first given), and repeatedly updating the code vectors to the centroids of partial regions of a feature parameter space which are obtained by the Voronois division.

Here, when a set of learning samples is represented by $x_j$ (j=0, 1, . . . , J−1), and a set of code vectors is represented by Y={$y_0, y_1, \ldots, y_{N-1}$}, learning-sample set $x_j$ is divided into N subsets $S_i$ (i=0, 1, . . . , N−1) by code-vector set Y in the Voronois division. In other words, when the distance between learning-sample set $x_j$ and code vector $y_i$ is represented by d ($x_j, y_i$), and the following expression holds with respect to all of t (t=0, 1, . . . , N−1) that does not equal i, $$d(x_j,y_i)<d(x_j,y_t) \qquad (1)$$

it is determined that learning-sample $x_j$ is ($x_j, S_i$) belonging to subset $x_j$.

In addition, when centroids C ($v_0, v_1, \ldots, v_{M-1}$) with respect to vectors $v_0, v_1, \ldots, v_{M-1}$ are defined by the following expression:

$$C(v_0, v_1, \ldots, v_{M-1}) = \underset{v}{\mathrm{argmin}}\left\{\frac{1}{M}\sum_{m=0}^{M-1} d(v, v_m)\right\} \qquad (2)$$

code vector $y_i$ is updated in accordance with the following expression $$y_i=C(\{S_i\}) \qquad (3)$$

In the expression (2), the right side "argmin { }" means vector v that minimizes the value in { }. A so-called "clustering technique" using expression (3) is called "k-means clustering". The details of the LGB algorithm are described in, for example, "Speech and Image Engineering" written by Kazuo Nakata and Satoshi Minami, published by Shokodo in 1987, pp. 29–31.

In the learning apparatus shown in FIG. 3, suffix i,j that indicates the row of element $S_{i,j}$ and $T_{i,j}$ in the codebook output by the codebook creator 52 represents the j-th element of the code vector corresponding to code #i. Thus, expression ($S_{i,1}, S_{i,2}, \ldots, S_{i,L}, T_{i,1}, T_{i,2}, \ldots, T_{i,M}$) represents a code vector corresponding to code #i. Element $S_{i,j}$ of the code vector corresponds to the image, and element $T_{i,j}$ corresponds to the speech.

A tentative normalizer 53 is supplied with image feature parameter $P_{i,j}$ and speech feature parameter $V_{i,j}$ (in this example it is assumed that both types of parameters are obtained from an image and speech different from those for the code-vector learning parameters) as normalization-coefficient learning parameters for learning normalization coefficient α. Similarly to the tentative normalizer 51, the tentative normalizer 53 tentatively normalizes image feature parameter $P_{i,j}$ and speech feature parameter $V_{i,j}$ by using the normalization coefficients from the normalization coefficient controller 55, and supplies the normalized parameters to the vector quantizer 54. In other words, among image feature parameter $P_{i,j}$ and speech feature parameter $V_{i,j}$ as normalization-coefficient learning parameters, speech feature parameter $V_{i,j}$ is multiplied by normalization coefficient a from the normalization coefficient controller 55 by the tentative normalizer 53, and the tentative normalizer 53 outputs the product to the vector quantizer 54.

The tentative normalizer 53 is supplied with a plurality of sets of normalization-coefficient learning parameters. The tentative normalizer 53 performs normalization with respect to each of the normalization-coefficient learning parameters.

The vector quantizer 54 performs vector quantization on the normalized normalization-coefficient learning parameters supplied from the tentative normalizer 53, using the latest codebook supplied from the codebook creator 52, and supplies quantization errors caused by the vector quantization to the normalization coefficient controller 55.

In other words, the vector quantizer 54 calculates, for the image and speech, a distance between each code vector of the codebook and each normalized normalization-coefficient learning parameter, and supplies the calculated shortest distance as a quantization error to the normalization coefficient controller 55. Specifically, the distance between image feature parameter $P_{i,j}$ among the normalized normalization-coefficient learning parameters, and image-related element $S_{i,j}$ of the code vector, is calculated, and the calculated shortest distance is supplied as an image-related quantization error to the normalization coefficient controller 55. At the same time, the distance between speech feature parameter $\alpha V_{i,j}$ among the normalized normalization-coefficient learning parameters, and speech-related element $T_{i,j}$ of the code vector, is calculated, and the calculated shortest distance is supplied as a speech-related quantization error to the normalization coefficient controller 55.

The normalization coefficient controller 55 accumulates, with respect to all the normalization-coefficient learning parameters, image- and speech-related quantization errors supplied from the vector quantizer 54, and changes normalization coefficient α to be supplied to the vector quantizers 51 and 53 so that both accumulated values are equal.

With respect to the flowchart shown in FIG. 4, a normalization-coefficient learning process performed by the learning apparatus shown in FIG. 3 is described below.

In the learning apparatus shown in FIG. 3, at first, code-vector learning parameters are supplied to the vector quantizer 51, and normalization-coefficient learning parameters are supplied to the vector quantizer 53. In addition, initial normalization coefficient a is supplied from the normalization coefficient controller 55 to the vector quantizers 51 and 53.

In step S21, the vector quantizer 51 tentatively normalizes the code-vector learning parameters by multiplying speech feature parameter $V_{i,j}$ among the code-vector learning parameters by normalization coefficient a from the normalization coefficient controller 55, and supplies the tentatively normalized parameters to the codebook creator 52.

When receiving the normalized code-vector learning parameters from the vector quantizer 51, the codebook creator 52 uses the received parameters in step S22 to create, based on the LBG algorithm, a codebook used when the vector quantizer 54 performs vector quantization. The codebook creator 52 supplies the created codebook to the vector quantizer 54.

In step S23, the tentative normalizer 53 tentatively normalizes the normalization-coefficient learning parameters by multiplying speech feature parameter $V_{i,j}$ among the normalization-coefficient learning parameters by normalization coefficient α from the normalization coefficient controller 55, and supplies the tentatively normalized parameters to the vector quantizer 54.

When receiving the latest codebook from the codebook creator 52, and receiving the latest normalized normalization-coefficient learning parameters from the tentative normalizer 53, the vector quantizer 54 uses the codebook from the codebook creator 52 in step S24 to perform vector quantization for the image and the speech. The vector quantizer 54 supplies the image- and speech-related quantization errors to the normalization coefficient controller 55.

In other words, in step S24, the vector quantizer 54 calculates a distance between image feature parameter $P_{i,j}$ (among the normalized normalization-coefficient learning parameters) and image-related element $S_{i,j}$ of the code vector, and supplies the calculated shortest distance as an image-related quantization error to the normalization coefficient controller 55. The vector quantizer 54 also calculates a distance between speech feature parameter $\alpha V_{i,j}$ (among the normalized normalization-coefficient learning parameters) and speech-related element $T_{i,j}$ of the code vector, and supplies the calculated shortest distance as a speech-related quantization error to the normalization coefficient controller 55.

As described, the vector quantizer 53 is supplied with the normalization-coefficient learning parameters. Thus, the vector quantizer 54 is also supplied with a plurality of sets of normalized normalization-coefficient learning parameters. The vector quantizer 54 successively finds, for each of the normalized normalization-coefficient learning parameters, the above-described image- and speech-related quantization errors, and supplies them to the normalization coefficient controller 55.

In step S24, the normalization coefficient controller 55 accumulates, for all the normalization-coefficient learning parameters, the image- and speech-related quantization errors supplied from the vector quantizer 54, thereby finding image-related quantization-error-accumulated value $D_P$ and speech-related quantization-error-accumulated value $D_V$. The obtained image-related quantization-error-value $D_P$ and speech-related quantization-error-accumulated value $D_V$ are supplied and stored in the normalization coefficient controller 55.

In step S25, the normalization coefficient controller 55 determines whether image-related quantization-error-accumulated value $D_P$ and speech-related quantization-error-accumulated value $D_V$ have been obtained with respect to all the values of normalization coefficient α. In other words, in this example, accumulated values $D_P$ and $D_V$ are found by, for example, initially setting normalization coefficient a at 0.001, and changing (increasing (in this example)) normalization coefficient α by 0.001 between 0.001 and 2.000. In step S25, the normalization coefficient controller 55 determines, for the image and the speech, whether quantization-error-accumulated values $D_P$ and $D_V$ have been found with respect to normalization coefficient α having the range.

If the normalization coefficient controller 55 has determined in step S25 that quantization-error-accumulated values $D_P$ and $D_V$ have not been found with all the values of normalization coefficient α, the normalization coefficient controller 55 changes normalization coefficient α in step S26, as described above, and supplies it to the tentative normalizers 51 and 53. After that, the normalization coefficient controller 55 proceeds back to step S21, and uses the changed values of normalization coefficient α to repeatedly perform the same processing.

If the normalization coefficient controller 55 has determined in step S25 that quantization-error-accumulated values $D_P$ and $D_V$ have been found with all the values of normalization coefficient α, it proceeds to step S27, and calculates the absolute value $|D_P-D_V|$ of the difference between image-related quantization error $D_P$ and speech-related quantization error $D_V$ (stored in step S24) with respect to each value of normalization coefficient $\alpha$. The normalization coefficient controller 55 also detects the value of normalization coefficient $\alpha$ that gives the minimum value of difference absolute value $|D_P-D_V|$. In other words, the normalization coefficient controller 55 ideally detects normalization coefficient $\alpha$ in the case where image-related quantization error $D_P$ and speech-related quantization error $D_V$ are identical. The normalization coefficient controller 55 proceeds to step S28, and terminates the process after outputting normalization coefficient $\alpha$ giving the minimum value of absolute value $|D_P-D_V|$, the output normalization coefficient $\alpha$ set for performing normalization so that image feature parameter $P_{i,j}$ and speech feature parameter $V_{i,j}$ can be treated having the same weight.

As described above, a codebook is created by normalizing code-vector learning parameters as integrated parameters composed of image and speech feature parameters, and using the normalized code-vector learning parameters, while performing the steps of tentatively normalizing normalization-coefficient learning parameters as integrated parameters composed of image and speech feature parameters, finding accumulated values of image- and speech-related quantization errors (minimum values of distances with the code vectors) by using the created codebook to perform vector quantization on each of image and speech feature parameters among the normalized normalization-coefficient learning parameters, and changing normalization coefficients so that image- and speech-related accumulated values are equal. Thereby, normalization coefficients for performing normalization so that feature parameters of different media such as image and speech can be treated having the same weight can be found.

As a result, when speech recognition is performed by using normalization coefficients to normalize feature parameters extracted from speech and feature parameters extracted from an image of lips of the speaker, integrating the feature parameters, and using the integrated parameters, the recognition is greatly affected by either the speech or the image. This can prevent an increase in the recognition factor from being hindered.

In addition, effects of the feature parameters (of the media) which constitute the integrated parameters, on the recognition factor, can be easily verified.

In the above-described case, the weights of the image feature parameters are used as a reference (set to be 1), and normalization coefficient $\alpha$ for setting the weights of the speech feature parameters to be identical to those of the image feature parameters is found. Therefore, the intermedia normalizer 21 (shown in FIG. 1) outputs the image feature parameters without performing any processing, while it normalizes the speech feature parameters by multiplying the speech feature parameters by the normalization coefficient $\alpha$ found as described above, and outputs the normalized speech feature parameters.

Although the learning that finds normalization coefficient $\alpha$ for setting the weights of the feature parameters of two types (image and speech) to be equal has been described with reference to FIG. 3, a type of learning can be performed that finds normalization coefficients for equalizing the weights of feature parameters of three or more types or the weights of feature parameters of media other than the image and the speech.

The above-described normalization coefficient learning can be applied regardless of the type and order of feature parameters because it is not dependent on the type and order of feature parameters.

FIG. 5 shows an example of the distance-transition matching unit 31 shown in FIG. 1.

From the integrated parameter generating unit 2 (shown in FIG. 1), for example, integrated parameters generated when a word was pronounced are in time series supplied to a time-domain normalizer 61. The time-domain normalizer 61 performs time-domain normalization on the supplied, integrated parameters.

When a speech time in which a word was pronounced is represented by t, a time change of an element among integrated parameters generated when the word was pronounced is as shown in, for example, FIG. 6A. Speech time t in FIG. 6A varies depending on each speech, even if the same person pronounced the same word. Accordingly, the time-domain normalizer 61 performs time-domain normalization so that speech time t is uniformly set to be time $T_C$, as shown in FIG. 6B. Assuming that the speech recognition apparatus (shown in FIG. 1) performs word recognition, time $T_C$ is set to be sufficiently longer than a general speech time required when a word to be recognized is pronounced. Thus, the time-domain normalizer 61 changes the integrated parameter shown in FIG. 6A so that it is so-called "extended" in the time-domain direction. The technique of the time-domain normalization is not limited to that shown in FIGS. 6A and 6B.

The time-domain-normalized parameters are supplied from the time-domain normalizer 61 to a vector quantizer 62. The vector quantizer 62 sequentially performs vector quantization on the time-domain-normalized integrated parameters, using a codebook stored in a codebook storage unit 63, and sequentially supplies a distance calculator 64 with codes as the vector quantizer results, that is, codes corresponding to code vectors nearest to the integrated parameters.

The codebook storage unit 63 stores the codebook, which is used when the vector quantizer 62 performs vector quantization on the integrated parameters.

The distance calculator 62 accumulates, in units of time, each distance between a distance-transition model of the word to be recognized and a code vector obtained when a code series output by the vector quantizer 62 is observed, and supplies the accumulated value to a sorter 66.

A distance-transition-model storage unit 65 stores a distance-transition model representing distances between time-series integrated parameters (normal series) of the word to be recognized, which are as shown in FIG. 7, and the code vectors of the codebook stored in the codebook storage unit 63. In other words, the distance-transition-model storage unit 65 stores a distance-transition model (as shown in FIG. 7) that is obtained by learning (described below) for each word to be recognized.

In the example shown in FIG. 7, the codebook stored in the codebook storage unit 63 has J+1 code vectors $C_0$ to $C_J$.

The sorter 66 selects upper Nb values (where Nb represents a natural number) in increasing order among distance-accumulated values on the distance-transition model of each word to be recognized, and outputs them, as a result of matching between the integrated parameters and the distance-transition model, to the determining unit 4.

The above-described, distance-transition matching unit 31 performs matching based on a distance-transition method. A matching process based on this distance-transition method is described below with reference to the flowchart shown in FIG. 8.

When receiving time-series integrated parameters corresponding to the pronunciation of a word from the integrated parameter generating unit 2 (shown in FIG. 1), the time-domain normalizer 61 performs time-domain normalization on the integrated parameters in step S31, and outputs the time-domain-normalized parameters to the vector quantizer 62. In step S32, the vector quantizer 62 sequentially performs vector quantization on the time-domain-normalized parameters supplied from the time-domain normalizer 61 by referring to the codebook stored in the codebook storage unit 63, and sequentially outputs a code series corresponding to code vectors having the shortest distances with the integrated parameters, as the vector-quantization results to the distance calculator 64.

In step S33, the distance calculator 64 accumulates each distance between the distance-transition model of the word to be recognized and each code vector obtained when the code series output by the vector quantizer 62 is observed.

In other words, when among the code series output by the vector quantizer 62, a code at time t is represented by $S_t$ (t=0, 1, . . . , $T_C$), the distance calculator 64 finds the distance between the code and code vector $C_j$ (j=0, 1, . . . , J) corresponding to code $s_0$ initially output by the vector quantizer 62 by referring to the distance-transition model. Specifically, when code $s_0$ corresponds to, for example, code vector $C_0$, the distance at time #0, which is on the curve indicating the distance transition from code vector $C_0$, is found in FIG. 7.

The distance calculator 64 calculates the distance at time #1 to code vector $C_j$ corresponding to code $s_1$ secondly output by the vector quantizer 62 by referring to the distance-transition model. Similarly, the distance calculator 64 sequentially finds distances up to the distance at time #$T_C$ to code vector $C_j$ corresponding to code STC finally output by the vector quantizer 62 by referring to the distance-transition model, and calculates an accumulated value of the distances.

After calculating accumulated values of distances for all distance-transition models stored in the distance-transition-model storage unit 62, the distance calculator 64 outputs the accumulated values to the sorter 66, and proceeds to step S34.

In step S34, the sorter 66 selects upper Nb values in increasing order among the accumulated values of distances on the distance-transition models of words to be recognized, and proceeds to step S35. In step S35, the sorter 66 outputs, to the determining unit 4, the selected values as a result of matching between the integrated parameters and the distance-transition models.

With reference to FIG. 9, a learning apparatus for performing learning that finds the distance-transition models to be stored in the distance-transition-model storage unit 62 (shown in FIG. 5) is described below.

A time-domain normalizer 71 is supplied with time-series, learning integrated parameters. The time-domain normalizer 71 performs time-domain normalization on the learning integrated parameters, similarly to the time-domain normalizer 61 (shown in FIG. 5), and supplies the normalized parameters to a distance calculator 72.

In other words, the time-domain normalizer 71 is supplied with, for example, a plurality of sets of time-series, learning integrated parameters for finding a distance-transition model of a word. The time-domain normalizer 71 performs time-domain normalization on each of the learning integrated parameters, and processes the normalized parameters to generate one learning integrated parameters. Specifically, a plurality of learning integrated parameters (Nc learning integrated parameters in FIG. 10) (on a word) that do not always have the same duration are supplied to the time-domain normalizer 71, as shown in column (A), FIG. 10.

The time-domain normalizer 71 performs time-domain normalization on the supplied parameters so that each of their durations is set to be time $T_C$, as shown in column (B), FIG. 10. The time-domain normalizer 71 calculates, for example, the mean of values sampled at the same time from the time-domain-normalized parameters, as shown by the graph (C) in FIG. 10, and generates one learning integrated parameter in which the calculated mean is used as a value sampled at each point of time.

Processing of a plurality of learning integrated parameters for generating one learning integrated parameter is not limited to the method described with reference to FIG. 10. If only a (time-series) learning integrated parameter for finding a distance-transition model of a word is provided, the learning integrated parameter is simply time-domain-normalized and output by the time-domain normalizer 71.

The distance calculator 72 sequentially calculates the distance between each code vector stored in the codebook storage unit 73 and each of the learning integrated parameters supplied from the time-domain normalizer 71, and supplies a polynomial unit 74 with each distance transition, i.e., transitions of distances (as shown in FIG. 11) between learning integrated parameters at time #0 to time #$T_C$ and the code vectors.

The codebook storage unit 73 stores a codebook identical to the codebook stored in the codebook storage unit 63 shown in FIG. 5.

The polynomial unit 74 finds a polynomial expression approximating the distance transitions supplied from the distance calculator 72, and outputs it as a distance-transition model. In other words, the polynomial unit 74 performs approximation of the distance transitions (shown in FIG. 11), using the curves shown in FIG. 7, which are expressed in a polynomial expression.

With reference to the flowchart shown in FIG. 12, processing by the learning apparatus shown in FIG. 9 is described below.

A plurality of (time-series) learning integrated parameters for finding a distance-transition model on a word are supplied to the time-domain normalizer 71.

In step S41, the time-domain normalizer 71 performs time-domain normalization on each of the supplied parameters, and processes the normalized parameters to generate one learning integrated parameter. The learning integrated parameter is output to the distance calculator 72.

In step S42, the distance calculator 72 sequentially calculates each distance between each code vector stored in the codebook storage unit 73 and the learning integrated parameter supplied from the time-domain normalizer 71, and supplies the polynomial unit 74 with transitions of the calculated distances.

In step S43, the polynomial unit 74 finds an N-th order polynomial expression for approximation of the distances between the learning integrated parameters (normal series) and the code vector, using, for example, least squares.

In other words, Nd-th order polynomial expression $f_j(t)$ for approximation of the distance between a learning integrated parameter at time t and code vector $C_j$ is expressed by the following expression:

$$f_j(t) = a_{j0} + a_{j1}t^1 + a_{j2}t^2 + \ldots + a_{jNd}t^{Nd} \qquad (4)$$

Thus, by solving the following expression, using distance $f_j(t)$ (obtained by the distance calculator 72) between the learning integrated parameter at time t and code vector $C_j$, coefficients $a_{j0}, a_{j1}, a_{j2}, \ldots, a_{jN}$ defining expression (4) can be found using least squares.

$$\begin{pmatrix} a_{j0} \\ a_{j1} \\ \vdots \\ a_{j\,Nd-1} \\ a_{j\,Nd} \end{pmatrix} = \begin{pmatrix} \sum t^{Nd} & \sum t^{Nd-1} & \cdots & \sum t^{1} & \sum t^{0} \\ \sum t^{Nd+1} & \sum t^{Nd} & \cdots & \sum t^{2} & \sum t^{1} \\ \vdots & \vdots & \ddots & \vdots & \vdots \\ \sum t^{2Nd-1} & \sum t^{2Nd-2} & & \sum t^{Nd} & \sum t^{Nd-1} \\ \sum t^{2Nd} & \sum t^{2Nd-1} & \cdots & \sum t^{Nd+1} & \sum t^{Nd} \end{pmatrix}^{-1} \quad (5)$$

$$\begin{pmatrix} \sum f_j(t)t^0 \\ \sum f_j(t)t^1 \\ \vdots \\ \sum f_j(t)t^{Nd-1} \\ \sum f_j(t)t^{Nd} \end{pmatrix}$$

The polynomial unit 74 solves expression (5) with respect to each of code vectors $C_0, C_1, \ldots, C_J$, thereby finding set A defining Nd-order polynomial expression $f_j(t)$ for approximation of transitions of distances between learning integrated parameters and code vectors $C_0, C_1, \ldots, C_J$. Set A is expressed by the following expression:

$$A = \begin{pmatrix} a_{0\,0} & a_{0\,1} & a_{0\,2} & \cdots & a_{0\,Nd-1} & a_{0\,Nd} \\ a_{1\,0} & a_{1\,1} & a_{1\,2} & \cdots & a_{1\,Nd-1} & a_{1\,Nd} \\ \vdots & \vdots & \vdots & \ddots & \vdots & \vdots \\ a_{J\,0} & a_{J\,1} & a_{J\,2} & \cdots & a_{J\,Nd-1} & a_{J\,Nd} \end{pmatrix} \quad (6)$$

In step S44, the polynomial unit 74 finds accumulated amounts with respect to each code vector $C_j$. the values obtained by accumulating an error amount in squares of distance transitions approximated by set A of coefficients in expression (A) and the actual distance transitions. The polynomial unit 74 stores the accumulated amounts, together with set A of coefficients, and proceeds to step S45.

In step S45, the polynomial unit 74 determines whether the accumulated amounts of square errors have been found with respect to all the range of order Nd. If the polynomial unit 74 has determined that the accumulated amounts of square errors have not been found with respect to all the range of order Nd, it proceeds to step S46, and changes the order Nd of polynomial expression $f_j(t)$ (expression (6)) to a value on which accumulated amounts of square errors have not been found yet. After that, the polynomial unit 74 returns to step S43, and repeatedly performs the same processing with respect to the changed value of order Nd.

If the polynomial unit 74 has determined in step S45 that the accumulated amounts of square errors have been found with respect to all the range of order Nd, it proceeds to step S47.

In step S47, after detecting a minimum value from among the accumulated amounts of square errors of distance transitions with respect to all the range of order Nd, the polynomial unit 74 outputs the minimum value, together with the stored set A of coefficients defining polynomial expression $f_j(t)$, and terminates the processing.

The above-described processing is performed for each word to be recognized.

As described above, by performing time-domain normalization on (time-series) learning integrated parameters, calculating each distance between each time-domain-normalized learning integrated parameter (normal series) and each code vector, and finding a distance-transition model indicating transitions of the distances, a model in accordance with the number of original states of an object to be recognized and state transitions can be obtained. Therefore, according to the obtained distance-transition model, the stationary state and transient state of an object to be recognized can be accurately expressed. As a result, the recognition factor can be increased.

In addition, distance transition is approximated using a polynomial expression. Thus, by using only coefficients defining the polynomial expression, that is, a small amount of data, distance transition can be expressed.

The order Nd of the polynomial expression for approximation of distance transition is determined so that an accumulated value of square errors is minimized. Thus, by using the polynomial expression, the distance transition can be precisely expressed.

The integrated parameters are used as data for learning by the learning apparatus shown in FIG. 9. However, when a single feature parameter is used to perform speech recognition, the single feature parameter may be used for learning.

Because the above-described method of distance-transition model learning may be applied regardless of the type and order of feature parameters, it is not dependent on the type and order of the feature parameters.

In the above-described example, actual distance transition as shown in FIG. 11 is performed such that a distance-transition model (as shown in FIG. 7) approximated by the polynomial expression is used to perform matching. However, matching can be performed, simply using the actual distance transition (as shown in FIG. 11).

With reference to FIG. 13, the spatial distribution matching unit 32 (shown in FIG. 1) is described below.

Integrated parameters are in time series supplied from the integrated parameter generating unit 2 to a vector quantizer 81. The vector quantizer 81 performs vector quantization on the supplied parameters, using a codebook stored in a codebook storage unit, and sequentially supplies a code series as a result of the vector-quantization to a chi-square ($\chi^2$) test unit 83.

The codebook storage unit 82 stores the codebook, which is used for vector quantization by the vector quantizer 81. It is not required that the codebook stored in the codebook storage unit 82 (shown in FIG. 13) be identical to that stored in the codebook storage unit 63 of the distance-transition matching unit 63 (shown in FIG. 5).

By performing the chi-square test, the chi-square test unit 83 finds, accessing an expectancy-degree storage unit 84, a test result on whether the spatial distribution of the code series from the vector quantizer 81 is similar to the spatial distribution of a code series obtained when a word to be recognized is pronounced, that is, on whether the integrated parameters supplied to the vector quantizer 81 appropriately correspond to the word to be recognized. The obtained test result is supplied to a sorter 85.

The expectancy-degree storage unit 84 stores degrees of expectancy observed (output from the vector quantizer 81) when the integrated parameters corresponding to the word to be recognized are input (supplied to the vector quantizer 81) with respect to codes corresponding to the code vectors of the codebook stored in the codebook storage unit 82.

The sorter 85 selects upper Nb values in increasing order from among the values of the test result supplied from the chi-square test unit 83, and outputs the selected values as a result of matching by the spatial distribution method to the determining unit 4 (shown in FIG. 1).

The spatial distribution matching unit 32 having the above-described structure performs matching by the spatial distribution method. The process of the matching by the spatial distribution method is described below with reference to the flowchart shown in FIG. 14.

Integrated parameters to be recognized are in time series supplied to the vector quantizer 81. In step S51, the vector quantizer 81 sequentially performs vector quantization on the supplied parameters, and supplies the chi-square test unit 83 with a code series as a result of the vector-quantization.

In step S52, the chi-square test unit 83 finds distribution of the code series supplied from the vector quantizer 81. In other words, the chi-square test unit 83 computes the number of times each code is observed (hereinafter referred to also as the "observation degree") in the code series supplied from the vector quantizer 81.

In step S53, the chi-square test unit 83 performs the chi-square test, using the observation degree of each code and each expectancy degree (stored in the expectancy-degree storage unit 84) representing an expected number of times each code is observed when a word to be recognized is pronounced, thereby finding each degree (hereinafter referred to also as "similarity degree") of how much the observation degree of each code on an integrated parameter is similar to the expectancy degree of each code on the word to be recognized. The chi-square test unit 83 outputs the similarity degree of each code to the sorter 85.

Specifically, the chi-square test unit 83 computes chi-square $\chi^2$ expressed as the following expression:

$$\chi^2 = \sum_{i=0}^{J} \frac{(F_i - f_i)^2}{f_i} \quad (7)$$

where $F_j$ represents the observation degree of code #j and $f_j$ represents the expectancy degree of code #j in word W. The chi-square test unit 83 supplies, for example, the reciprocal of chi-square $\chi^2$ as the similarity degree for word W to the sorter 85.

Chi-square $\chi^2$ in expression (7) decreases as the similarity of the observation degree of each code on the input integrated parameter to the expectancy degree of each code on the word to be recognized increases. Therefore, the reciprocal of chi-square $\chi^2$, i.e., the similarity degree increases as the similarity of the observation degree of each code on the input integrated parameter to the expectancy degree of each code on the word to be recognized increases.

When receiving, from the chi-square test unit 83, the similarity degrees of all words to be recognized, the sorter 85 selects upper Nb values in order of similarity from among similarity degrees in step S54. In step S55, the sorter 85 outputs the selected values as a result of matching by the spatial distribution method to the determining unit 4, and terminates the processing.

According to the above-described matching by the spatial distribution method, the use of the chi-square test finds similarity between the distribution state of input integrated parameters and the distribution state of integrated parameters on a word to be recognized in the integrated parameter space. Thus, the similarity is not influenced by a time-related change in the input speech. In other words, although the duration of the input speech (the length of a speech period) influences the observation degree used in the chi-square test, a result of the chi-square test is not influenced because it is expected that the observation degree on each code increases or decreases by a value proportional to the length of the speech period. Thus, speech recognition can be performed irrespective of time components in the speech. As a result, the recognition factor can be increased.

FIG. 15 shows an example of a learning apparatus for learning that finds the expectancy degree (stored in the expectancy-degree storage unit 84 shown in FIG. 13) of each code on each word to be recognized.

A vector quantizer 91 is supplied with (time-series) learning integrated parameters on a word to be recognized. The vector quantizer 91 performs vector-quantization on the supplied parameters, using a codebook stored in a codebook storage unit 92, and supplies a code series as a result of the vector-quantization to an expectancy-degree computing unit 93.

The codebook storage unit 92 stores a codebook identical to that stored in the codebook storage unit 82 (shown in FIG. 13).

The expectancy-degree computing unit 93 computes the number of times each code is observed in the code series supplied from the vector quantizer 91.

With reference to the flowchart shown in FIG. 16, a process by the learning apparatus (shown in FIG. 15) is described below.

For one word to be recognized, for example, a plurality of (time-series) learning integrated parameters (obtained such that different speakers pronounce the word, or the same speaker pronounces the word a plural number of times) are supplied to the vector quantizer 91. In step S61, variable i counting the number of the integrated parameters is initialized to, for example, 1, and the process proceeds to step S62.

In step S62, among the learning integrated parameters, the first learning integrated parameter is supplied to the vector quantizer 91, and the vector quantizer 91 performs vector-quantization on the supplied parameter. A code series as a result of the vector-quantization is supplied to the expectancy-degree computing unit 93, and the process proceeds to step S63.

In step S63, the number of times each is observed in the code series supplied from the vector quantizer 91 is accumulated, whereby the observation degree of each code is found.

In step S64, the process determines whether the next learning integrated parameter to be processed is detected. If the process has determined that the next learning integrated parameter to be processed is detected, it proceeds to step S62, and variable i is incremented by 1. The process proceeds to step S62, and the subsequent learning integrated parameter is similarly processed. Thereby, the observation degree of each code corresponding to a plurality of learning integrated parameters is accumulated.

If the process has determined that the next learning integrated parameter to be processed is not detected, it proceeds to step S66.

In step S66, and the accumulated value, obtained by accumulating the observation degree of the each code, is divided by variable i, in other words, a mean of the observation degree of each code from the learning integrated parameters on a word is found. The mean is output as the expectancy degree of each code on the word, and the process ends.

The process shown in FIG. 16 is performed for each word to be processed.

According to the speech recognition apparatus shown in FIG. 1, normalization coefficients for performing normalization so that feature parameters of different media such as image and speech can be treated having the same weight are found beforehand, and feature parameters normalized using the normalization coefficients are used to generate integrated parameters. However, when speech recognition is performed, the use of the integrated parameters may not always be proper.

In other words, feature parameters are normalized using fixed normalization coefficients, and further integrated by the speech recognition apparatus shown in FIG. 1. Thus, even if image feature parameters and speech feature parameters have noticeable characteristics (denoted by arrows) at a time, respectively, as shown in FIG. 17, graph (A) and graph (B), integration using fixed normalization coefficients may cause a situation in which both the image element and the speech element in the integrated parameters cancel each other (as shown in FIG. 17, graph (C)) and their noticeable characteristics are lost. In FIG. 17, in each graph, the horizontal axis indicates time, and the vertical axis indicates the reciprocal of a distance between a code and a normal pattern (e.g., a centroid vector, etc., of the codebook stored in the codebook storage unit 63 shown in FIG. 5) minimizing the distance to a feature parameter at each time.

Accordingly, in order to increase the recognition factor, it is preferable to generate integrated parameters by integrating the feature parameters (in optimal form) so that their characteristics (denoted by arrows in FIG. 17, graph (D)) cannot be lost, as shown in FIG. 17, graph (D) showing integrated parameters caused by time-varying normalization coefficients and integrated signal generation using superior characteristics of media. For generating the integrated parameters, it is required to use, at each time, (time-series) normalization coefficients by which integrated parameters reflect a plurality of feature parameters.

Nevertheless, when speech recognition is performed using integrated parameters obtained by simply arranging (combining) audio feature parameters and image feature parameters, the recognition is greatly affected by either the speech or the image. In other words, the feature parameters of either type have a larger weight, which may prevent the recognition factor from increasing.

SUMMARY OF THE INVENTION

Accordingly, it is an object of the present invention to provide an information processing apparatus that increases recognition performance by treating, in optimal form, feature parameters based on different types of inputs such as speech and an image.

To this end, according to an aspect of the present invention, the foregoing object is achieved through provision of an information processing apparatus including a feature parameter detector for detecting feature parameters based on a plurality of input data, a normalizer for normalizing the feature parameters detected by the feature parameter detector while maintaining their feature components, and an integration unit for integrating the feature parameters normalized by the normalizer.

According to another aspect of the present invention, the foregoing object is achieved through provision of a learning apparatus including a normalizer for normalizing, based on first normalization information preset for a plurality of time-series input data, feature parameters of the input data, a detector for detecting a distance between a normal parameter and each of the normalized feature parameters, and a normalization information generator for generating, based on each detected distance, second time-series normalization information for each of the feature parameters.

According to a further aspect of the present invention, the foregoing object is achieved through provision of a learning apparatus including a feature parameter detector for detecting feature parameters based on a plurality of input data, a first normalizer for normalizing the feature parameters detected by the feature parameter detector among the feature parameters, a second normalizer for normalizing the feature parameters normalized by the first normalizer based on the order thereof, a matching unit for performing a matching process on each of the feature parameters normalized by the second normalizer, and a normalization-information generator for generating, based on the result of each matching process from the matching unit, time-varying normalization information.

According to a still further aspect of the present invention, the foregoing object is achieved through provision of an information processing method including the steps of detecting feature parameters based on a plurality of input data, normalizing the feature parameters while maintaining their feature components, and integrating the normalized feature parameters.

According to yet another aspect of the present invention, the foregoing object is achieved through provision of a learning method including the steps of normalizing, based on first normalization information preset for a plurality of time-series input data, feature parameters of the input data, detecting a distance between a normal parameter and each of the normalized feature parameters, and generating, based on each detected distance, second time-series normalization information for each of the feature parameters.

According to a further aspect of the present invention, the foregoing object is achieved through provision of a learning method including the steps of detecting feature parameters based on a plurality of input data, normalizing the detected feature parameters among the feature parameters, further normalizing the normalized feature parameters normalized based on the order thereof, performing a matching process on each of the further normalized feature parameters, and generating, based on the result of each matching process, time-varying normalization information.

DESCRIPTION OF THE PREFERRED EMBODIMENTS

Figure 18:
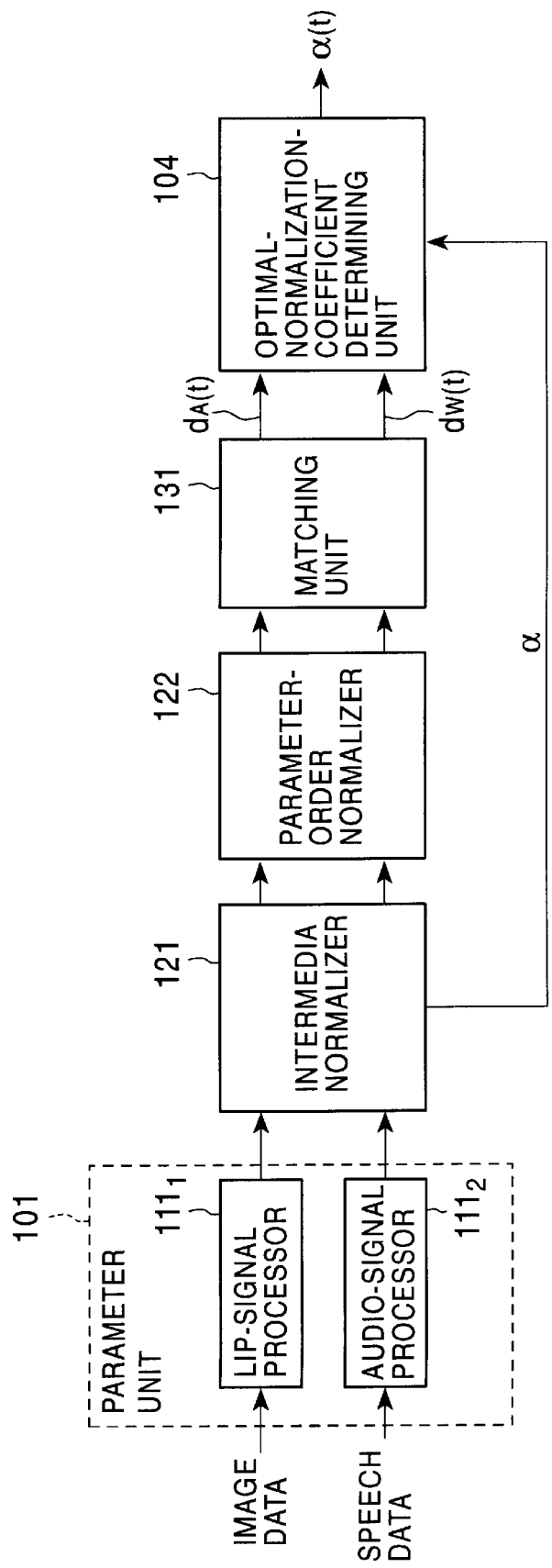
FIG. 18 is a block diagram showing a learning apparatus according to an embodiment of the present invention.

FIG. 18 shows a learning apparatus according to an embodiment of the present invention, which performs learning for finding (time-series) normalization coefficients. For brevity of description, it is assumed that the learning apparatus uses two types of feature parameters on speech (speech data) and an image (lip image) to generate integrated parameters.

Speech data for learning and lip-image data for learning are input to a parameter unit 101. The parameter unit 101 extracts feature parameters from the speech data and the image data, similarly to the parameter unit 1 shown in FIG. 1. The parameter unit 101 includes a lip-signal processor $111_1$ and an audio-signal processor $111_2$. The lip-signal processor $111_1$ processes the speech data, and the audio-signal processor $111_2$ processes the image data, whereby both processors extract and output feature parameters to an intermedia normalizer 121.

The intermedia normalizer 121 uses (fixed) normalization coefficient α obtained by the learning apparatus (shown in FIG. 3), as a learning normalization coefficient. The intermedia normalizer 121 normalizes, based on normalization coefficient α, the (time-series) speech and image feature parameters input from the parameter unit 101, and supplies the normalized parameters to a parameter-order normalizer 122.

Figure 1:
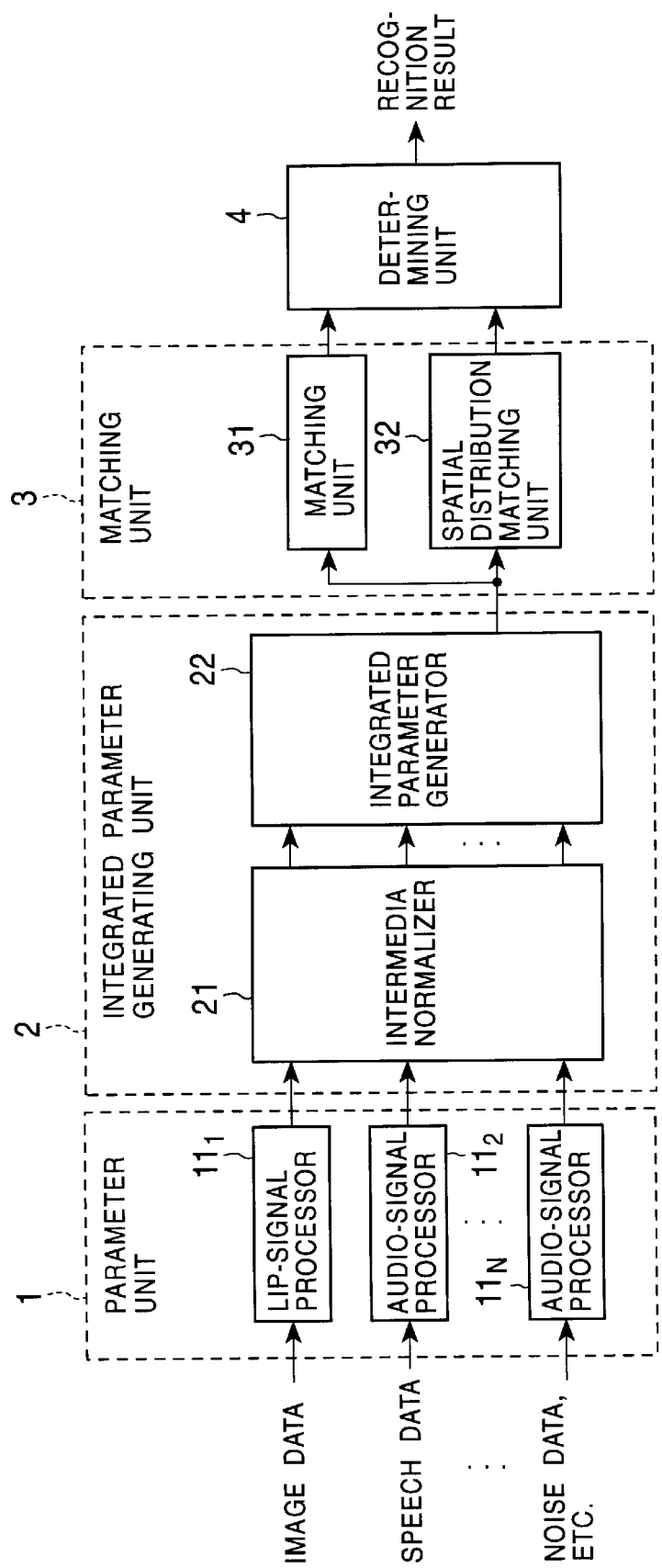
FIG. 1 is a block diagram showing a speech recognition apparatus according to an embodiment of the present invention, which uses integrated parameters to perform speech recognition.
Figure 2:
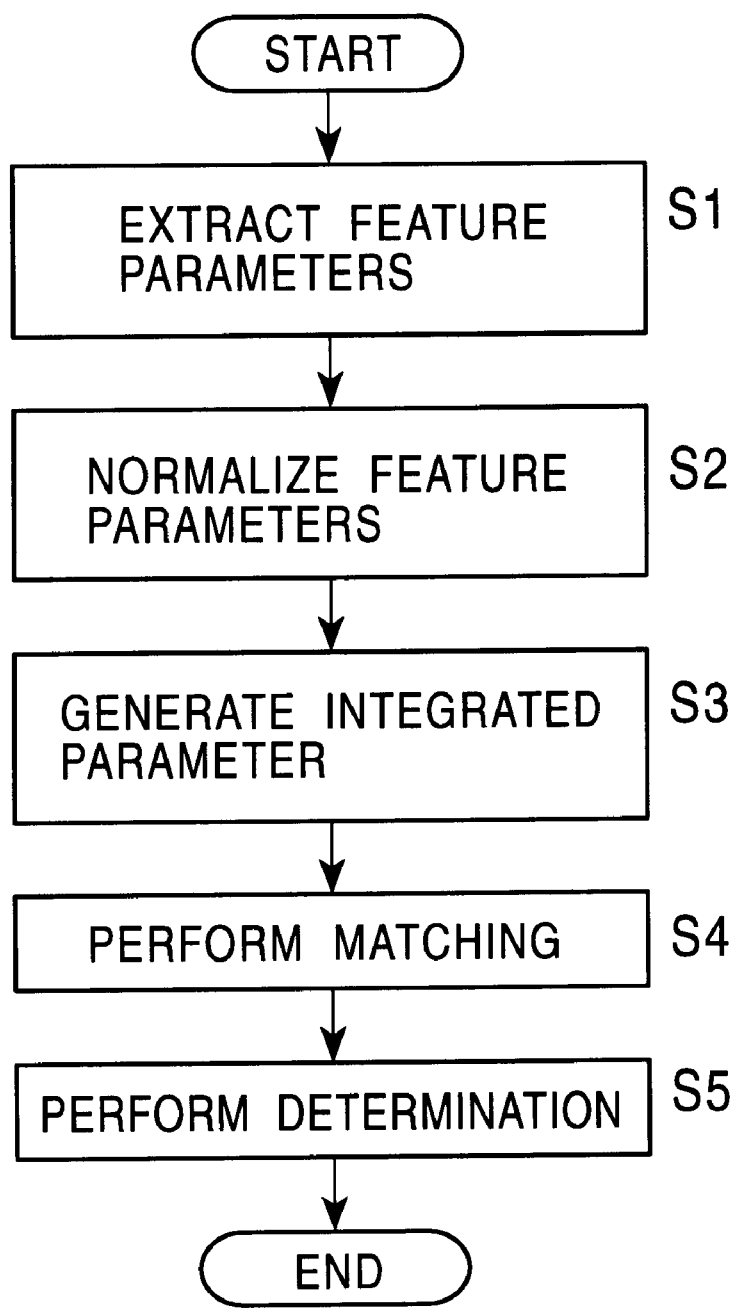
FIG. 2 is a flowchart illustrating a process by the speech recognition apparatus shown in FIG. 1.

In the learning apparatus shown in FIG. 1, the weights of image feature parameters are used as a reference, and speech feature parameters are multiplied by the values of normalization coefficient α so that the weights of the speech feature parameters are equal to those of the image feature parameters. Similar normalization is performed in the intermedia normalizer 121 shown in FIG. 18.

The parameter-order normalizer 122 performs normalization (hereinafter referred to as "order normalization", as required) on the order of each speech feature parameter and each image feature parameter from the intermedia normalizer 121. Specifically, when the order of each image feature parameter is represented by L, and the order of each speech feature parameter is represented by M, the parameter-order normalizer 122 divides the image feature parameter by $L^{1/2}$ and the speech feature parameter by $M^{1/2}$. The need of order normalization is described later.

The intermedia normalizer 121 performs normalization using normalization coefficient α, and the image and speech feature parameters processed by the parameter-order normalizer 122 so that order normalization is performed are supplied to a matching unit 131. The matching unit 131 performs matching by calculating the distance between each normalized feature parameter and a normal pattern. In other words, the matching unit 131 performs, for example, distance-transition-used matching on the normalized image and speech feature parameters, and supplies the matching results to the an optimal-normalization-coefficient determining unit 104.

The optimal-normalization-coefficient determining unit 104 finds, based on the matching results supplied from the matching unit 131, normalization coefficients based on which noticeable characteristics of the image and speech parameters are reflected at each time t by integrated parameters, that is, (time-series) optimal normalization coefficient α(t).

A process by the learning apparatus shown in FIG. 18 is described below with reference to the flowchart shown in FIG. 19.

Learning data on an image of lips and learning data on speech, which are related to a word to be learned (recognized), are input to the parameter unit 101 shown in FIG. 18.

In step S71, the parameter unit 101 extracts feature parameters from the input image and speech data, and supplies them to the intermedia normalizer 121.

Figure 3:
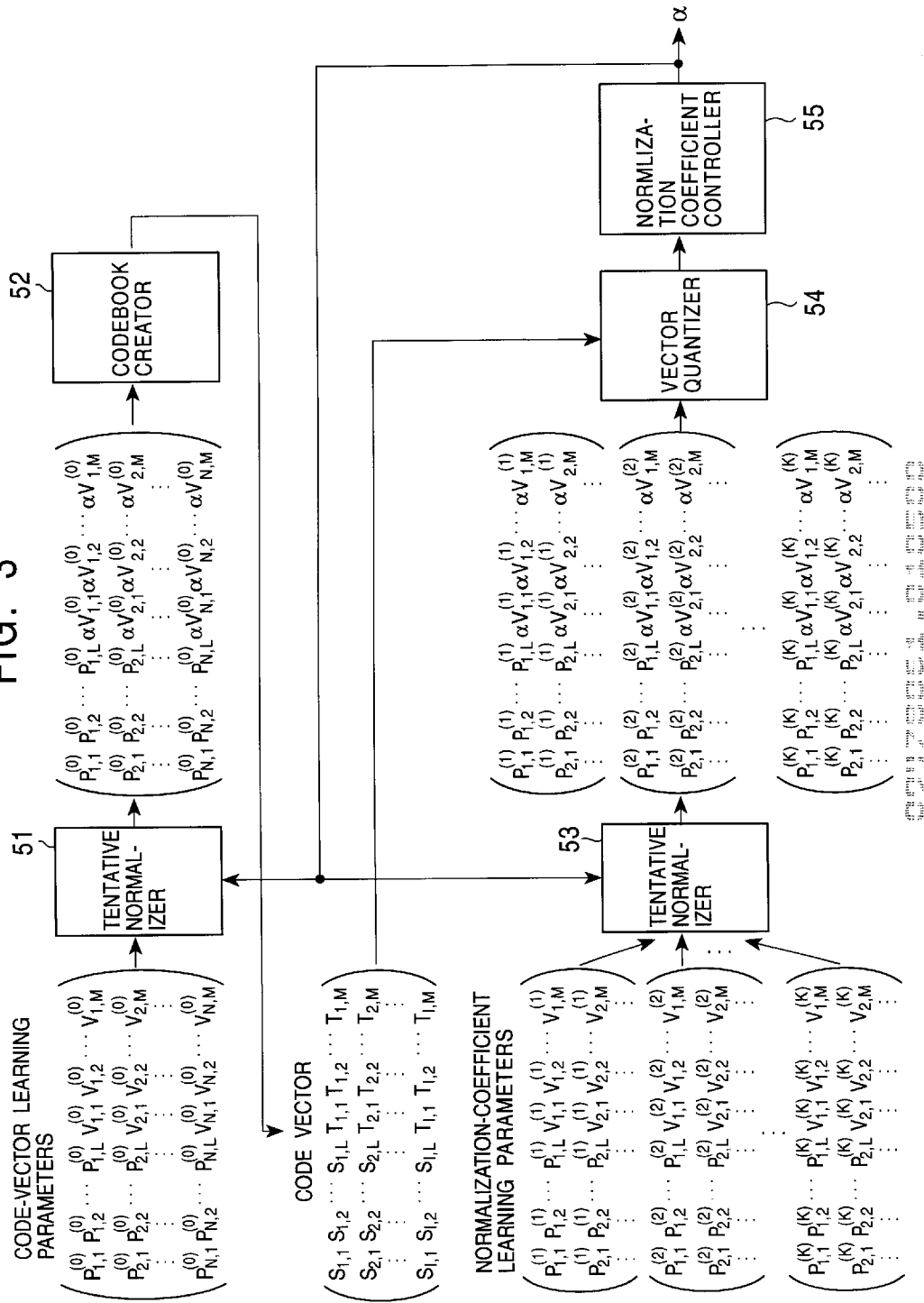
FIG. 3 is a block diagram showing an example of a learning apparatus that learns normalization coefficients used by the intermedia normalizer 21 shown in FIG. 1.
Figure 4:
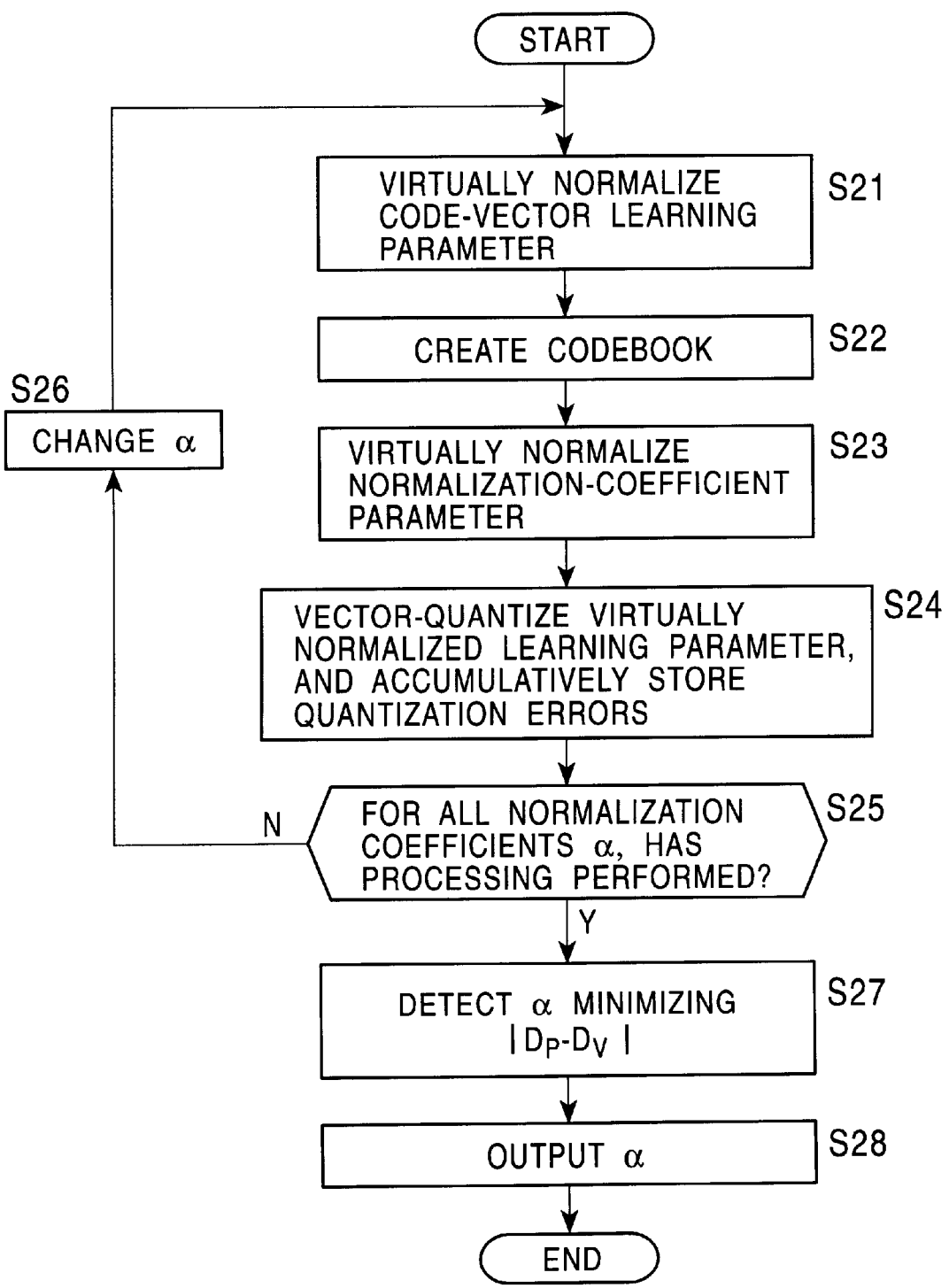
FIG. 4 is a flowchart illustrating a process by the learning apparatus shown in FIG. 3.

In step S72, the intermedia normalizer 121 uses (fixed) normalization coefficient α obtained by the learning apparatus shown in FIG. 3, as normalization coefficients for learning, and normalizes, based on normalization coefficient α, the image and speech feature parameters supplied from the parameter unit 101, similarly to the intermedia normalizer 21 shown in FIG. 1. The intermedia normalizer 121 outputs the normalized parameters to the parameter-order normalizer 122.

In step S73, the parameter-order normalizer 122 performs order normalization on the image and speech feature parameters supplied from the intermedia normalizer 121, and supplies the order-normalized parameters to the matching unit 131.

The process proceeds to step S74, and determines whether the input of learning image and speech data on a word to be learned is completed. If the process has determined that the data input has not been completed yet, the process awaits completion of the data input, and proceeds back to step S71 for repeatedly performs the steps from step S71. Thereby, the image and speech feature parameters (normalized using fixed normalization coefficient a and further order-normalized) for learning, which are related to the word to be learned, are in time series supplied to the matching unit 131.

If the process has determined that the data input on the word to be learned is completed, the process proceeds to step S75. In step S75, the matching unit 131 computes distances at each point of time from each of the image and speech feature parameters to a plurality of normal patterns by using the distance-transition method, and supplies the optimal-normalization-coefficient determining unit 104 with a distance series at the time, i.e., time-series distances.

In step S75, the optimal-normalization-coefficient determining unit 104 finds, based on the image- and speech-related time-series distances supplied from the matching unit 131, coefficients based on which noticeable characteristics of the image and speech parameters are reflected at each time t by integrated parameters, that is, (time-series) optimal normalization coefficient $\alpha(t)$. After that, the process terminates.

Figure 19:
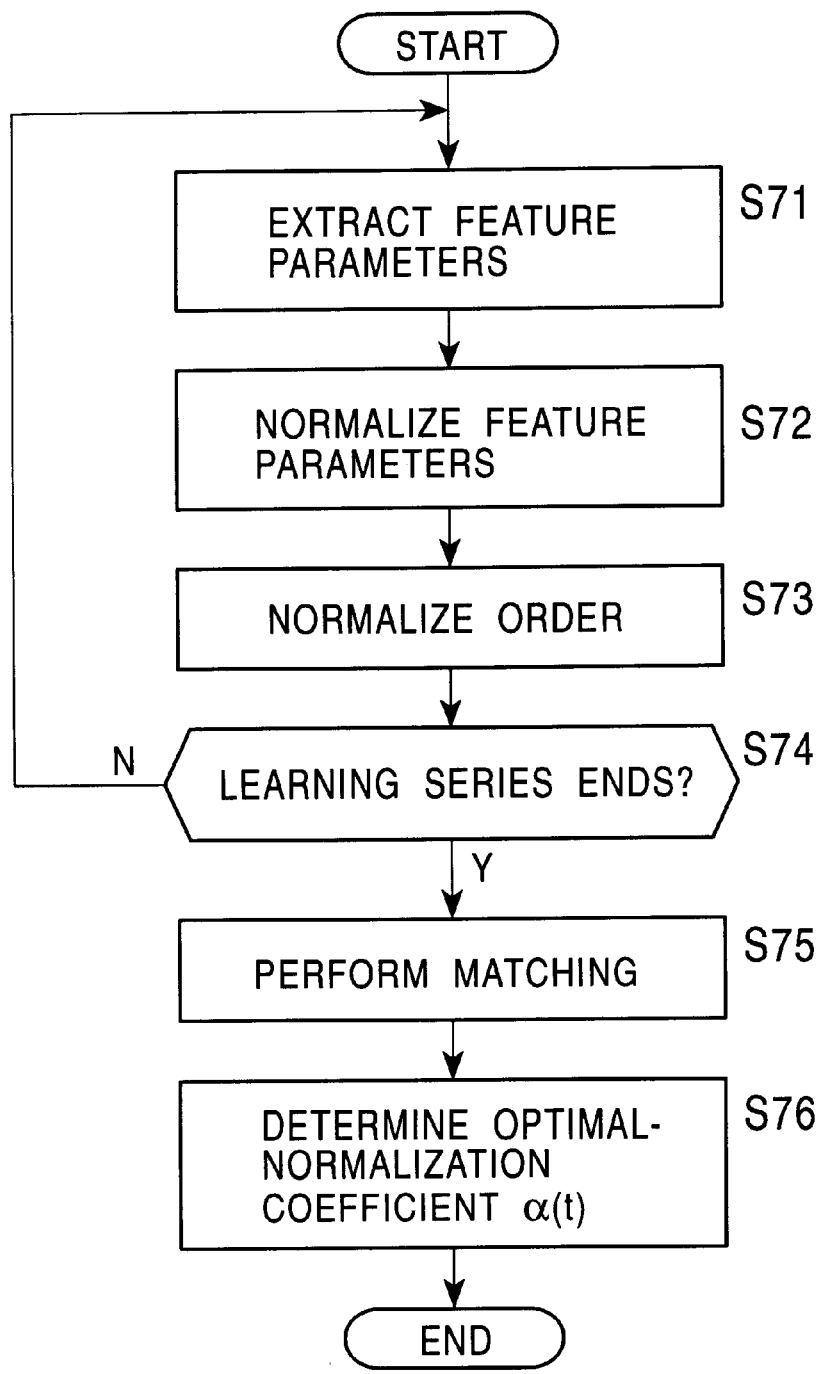
FIG. 19 is a flowchart illustrating a process by the learning apparatus shown in FIG. 18.

The process shown in FIG. 19 is performed for each word to be learned.

Figure 20:
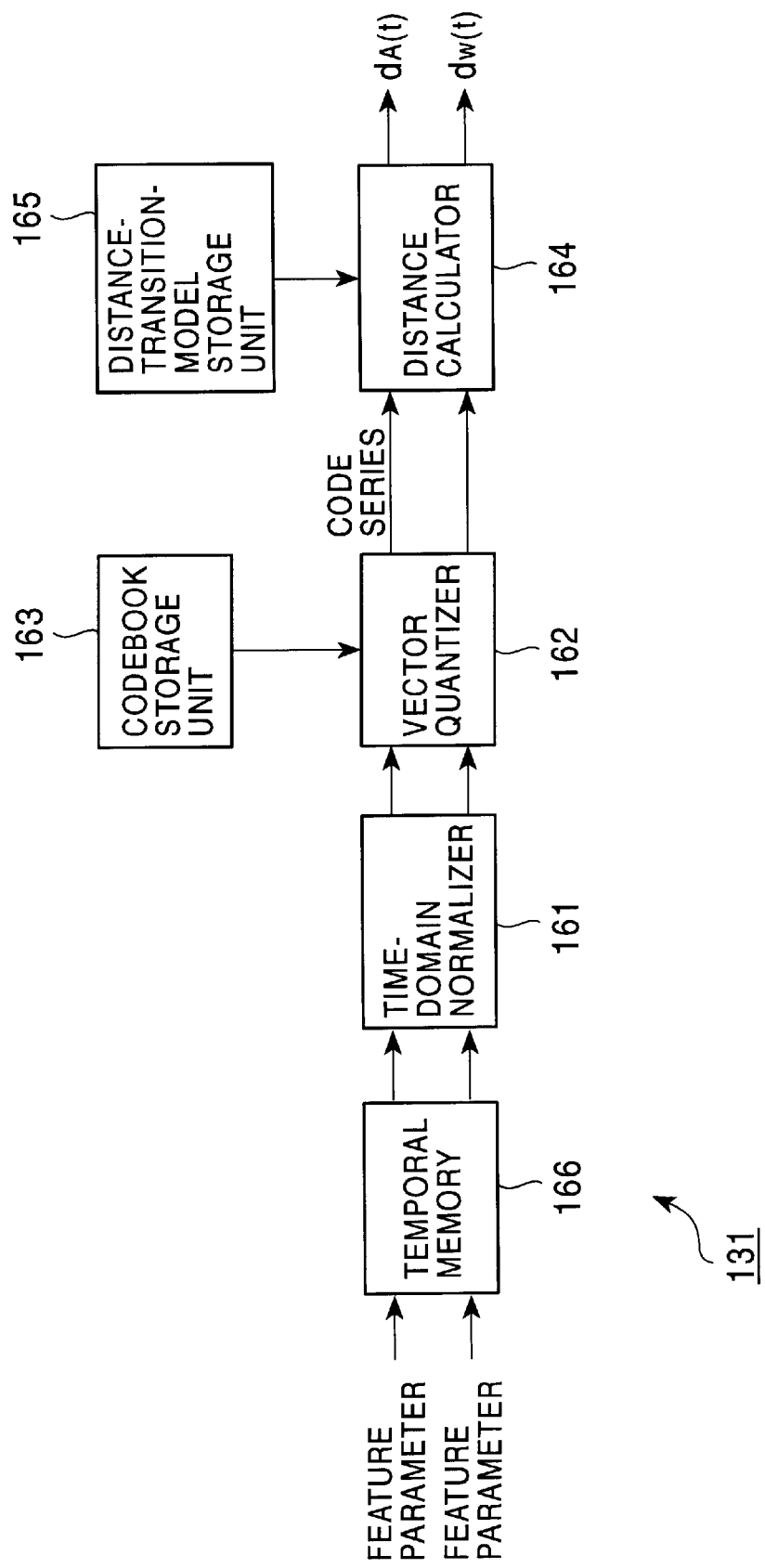
FIG. 20 is a block diagram showing an example of the matching unit 131 shown in FIG. 18.

With reference to FIG. 20, the matching unit 131 shown in FIG. 18 is described below.

The learning image and speech feature parameters from the parameter-order normalizer 122, which are related to each word to be learned, are supplied and temporarily stored in a temporal memory 166.

Figure 5:
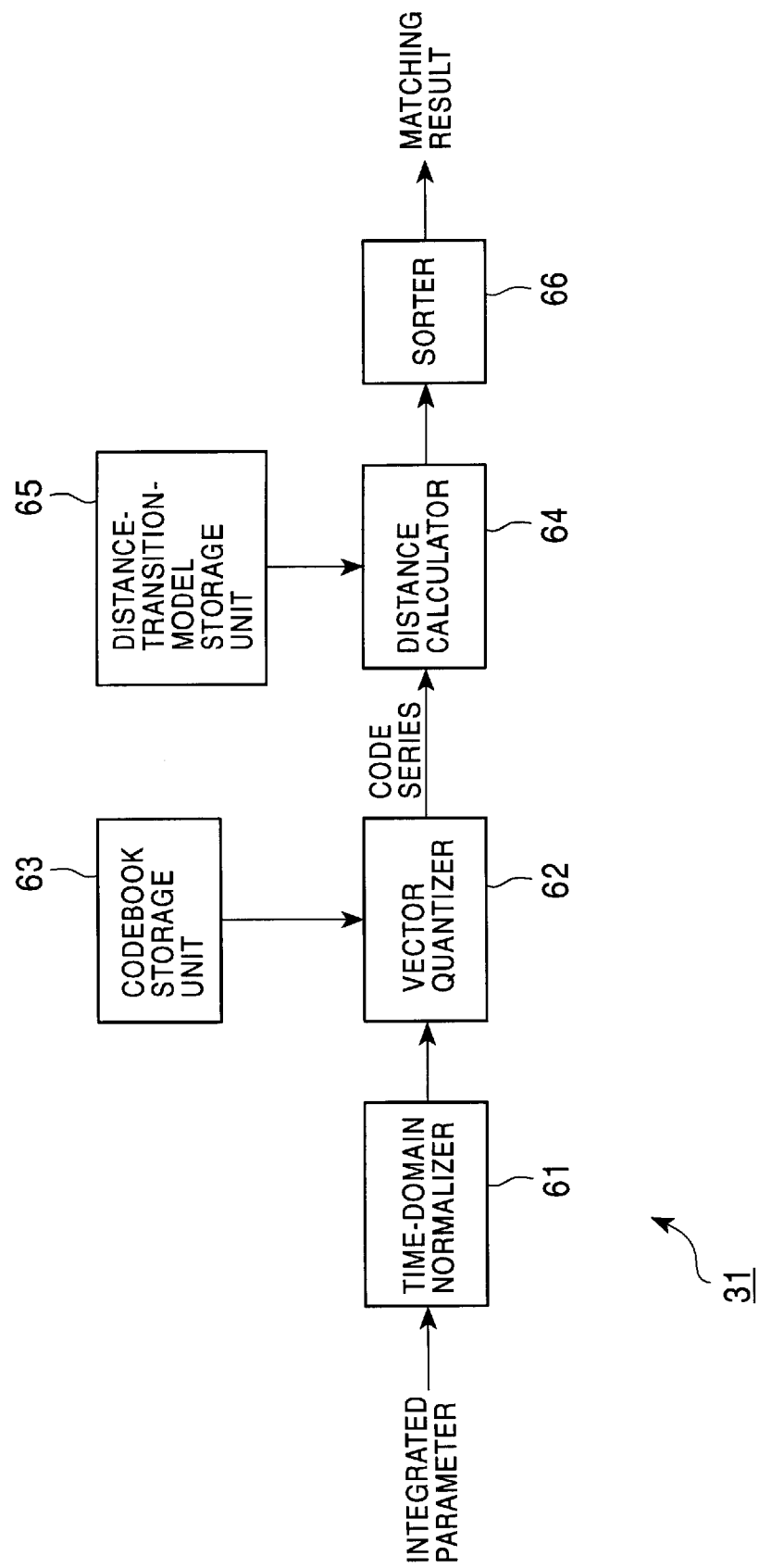
FIG. 5 is a block diagram showing an example of the distance-transition matching unit 31 shown in FIG. 1.

A time-domain normalizer 161 reads, from the memory 166, the image and speech feature parameters on each word to be learned, and performs time-domain normalization, similarly to the time-domain normalizer 61 shown in FIG. 5, to generate time-series feature parameters having time t from 0 to $T_C$. The time-domain-normalized image and speech feature parameters are supplied to a vector quantizer 162.

The vector quantizer 162 performs vector-quantization on the time-domain-normalized image and speech feature parameters supplied from the time-domain normalizer 61, similarly to the vector quantizer 62 shown in FIG. 5. In other words, a codebook storage unit 163 stores a codebook identical to that stored in the codebook storage unit 63 shown in FIG. 5, and the vector quantizer 162 uses the codebook to perform normalization on the image and speech feature parameters. The resultant image and speech code series are supplied to a distance calculator 64.

Because the codebook stored in the codebook storage unit 163 is identical to that stored in the codebook storage unit 63, it has code vectors in a space having integrated parameters obtained by integrating image and speech feature parameters. The vector quantizer 162 performs vector quantization on each of the time-domain-normalized image and speech feature parameters. In other words, the vector quantizer 162 performs vector-quantization, using only image elements of code vectors in the integrated parameter space for the image, while using only speech elements of code vectors in the integrated parameter space for the speech.

Figure 21:
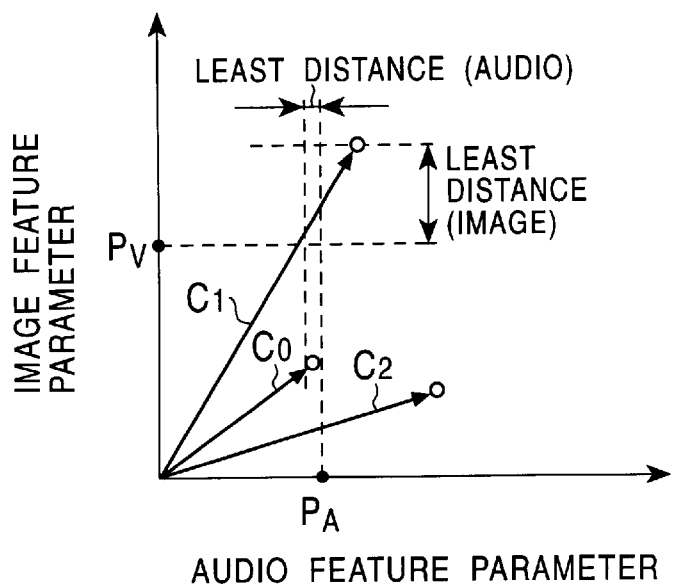
FIG. 21 is a graph illustrating a process by the vector quantizer 162 shown in FIG. 20.

Specifically, it is assumed that the codebook storage unit 163 stores a codebook defined by code vectors $C_0$, $C_1$, and $C_2$ in the integrated parameter space shown in FIG. 21 where the horizontal axis indicates the speech and the vertical axis indicates the image. In this condition, when image feature parameter $P_V$ and speech feature parameter $P_A$ are input to the vector quantizer 162, the vector quantizer 162 calculates, as to image feature parameter $P_V$, distances from image feature parameter $P_V$ to code vectors $C_0$, $C_1$, and $C_2$, referring to image elements of the code vectors, and finds a code vector having the least distance. Accordingly, in FIG. 21, code vector $C_1$ having the least distance to image feature parameter $P_V$ is found, and a code corresponding to code vector $C_1$ is output as a result of vector-quantization on image feature parameter $P_V$.

As to speech feature parameter $P_A$, the vector quantizer 162 calculates distances from speech feature parameter $P_A$ to code vectors $C_0$, $C_1$, and $C_2$, referring to only speech elements of the code vectors, and finds a code vector having the least distance. Accordingly, in FIG. 21, code vector $C_0$ having the least distance to speech feature parameter $P_A$ is found, and a code corresponding to code vector $C_0$ is output as a result of vector-quantization on speech feature parameter $P_A$.

As described above, for the image and the speech, the vector quantizer 162 performs vector-quantization, referring to only image and speech elements of code vectors in the integrated parameters. Therefore, in order to absorb the difference between the orders of the image and the speech, the parameter-order normalizer 122 (shown in FIG. 18) performs order-normalization on the image and speech feature parameters. The parameter-order normalizer 122 (shown in FIG. 18) divides a feature parameter by the square root of the order of the feature parameter, thereby performing order-normalization. This equals the setting of the length (norm) (the distance between the origin of the integrated parameter space and a point represented by the feature parameter in the space) of a feature parameter (feature vector) in the integrated space to be 1.

Referring back to FIG. 20, code series as the time-series feature parameter vector-quantization results obtained by the vector quantizer 162 are supplied to the distance calculator 164.

From the distance-transition model of the word to be learned, which is stored in the distance-transition-model storage unit 165, the distance calculator 164 finds distances to code vectors corresponding to codes output at each point of time by the vector quantizer 162 when the codes are observed.

Figure 7:
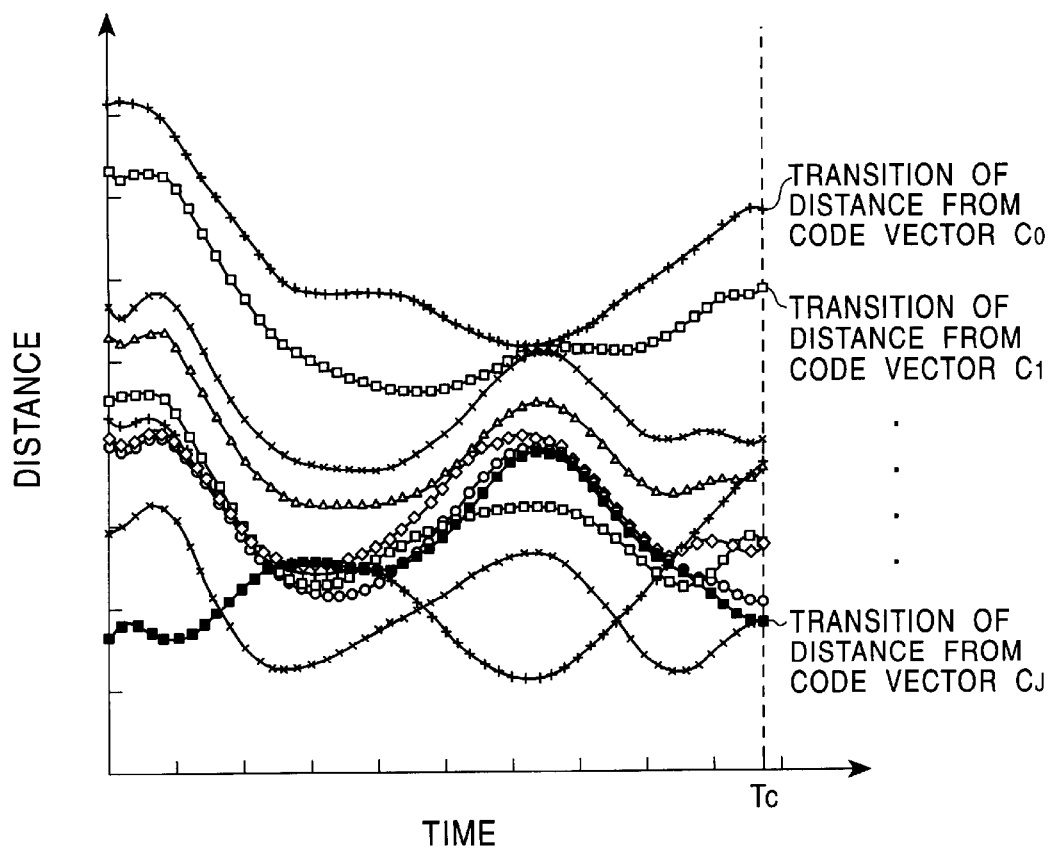
FIG. 7 is a graph illustrating a distance-transition model stored in the distance-transition-model storage unit 62 shown in FIG. 5.
Figure 8:
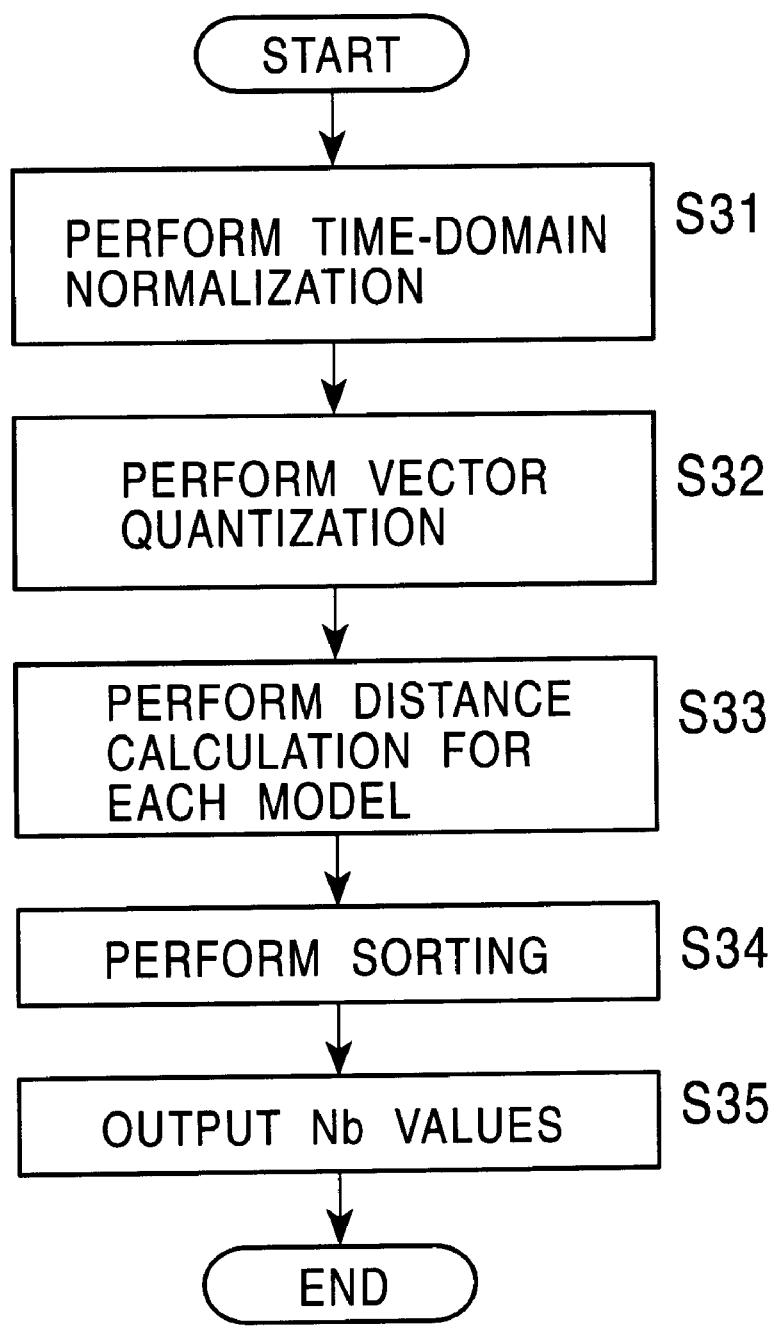
FIG. 8 is a flowchart illustrating a process by the distance-transition matching unit 31 shown in FIG. 5.
Figure 9:
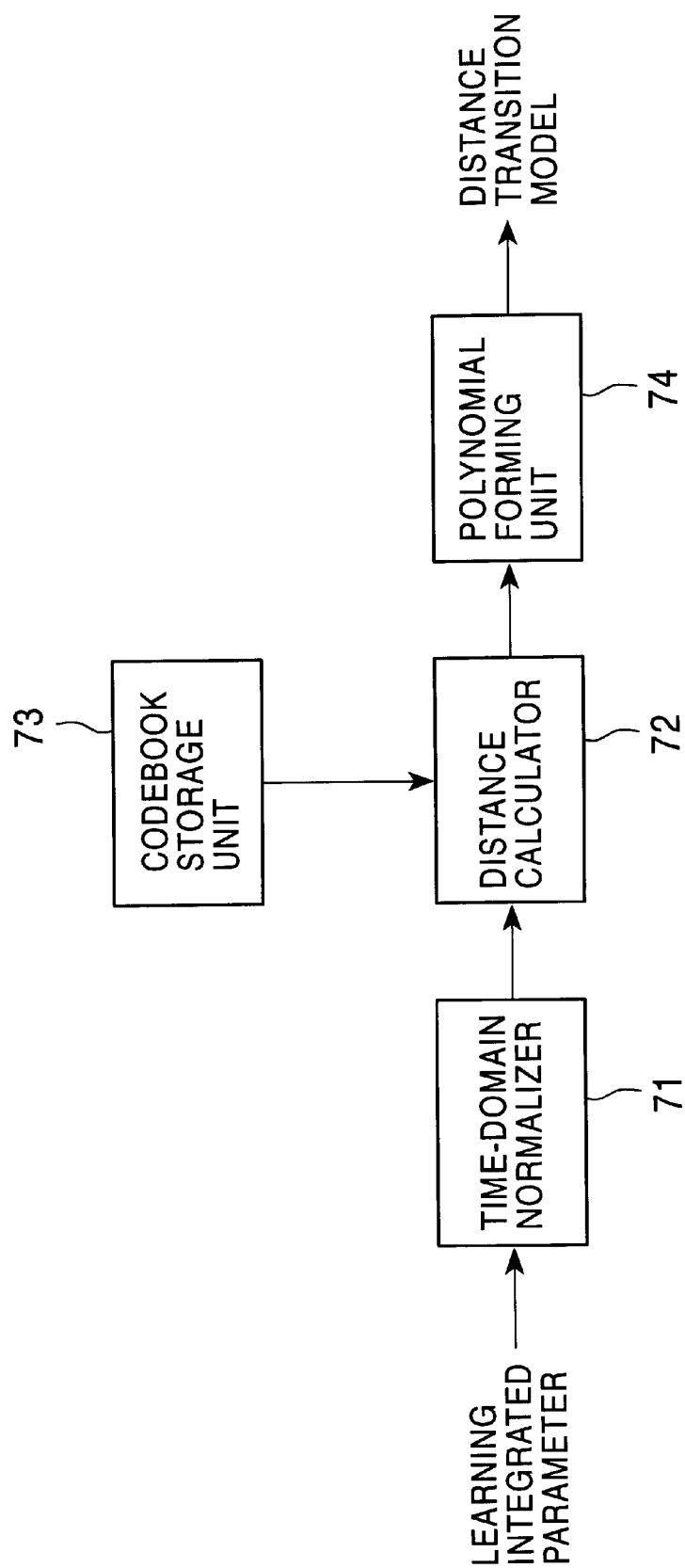
FIG. 9 is a block diagram showing an example of a learning apparatus that performs learning for finding distance-transition models.
Figure 10:
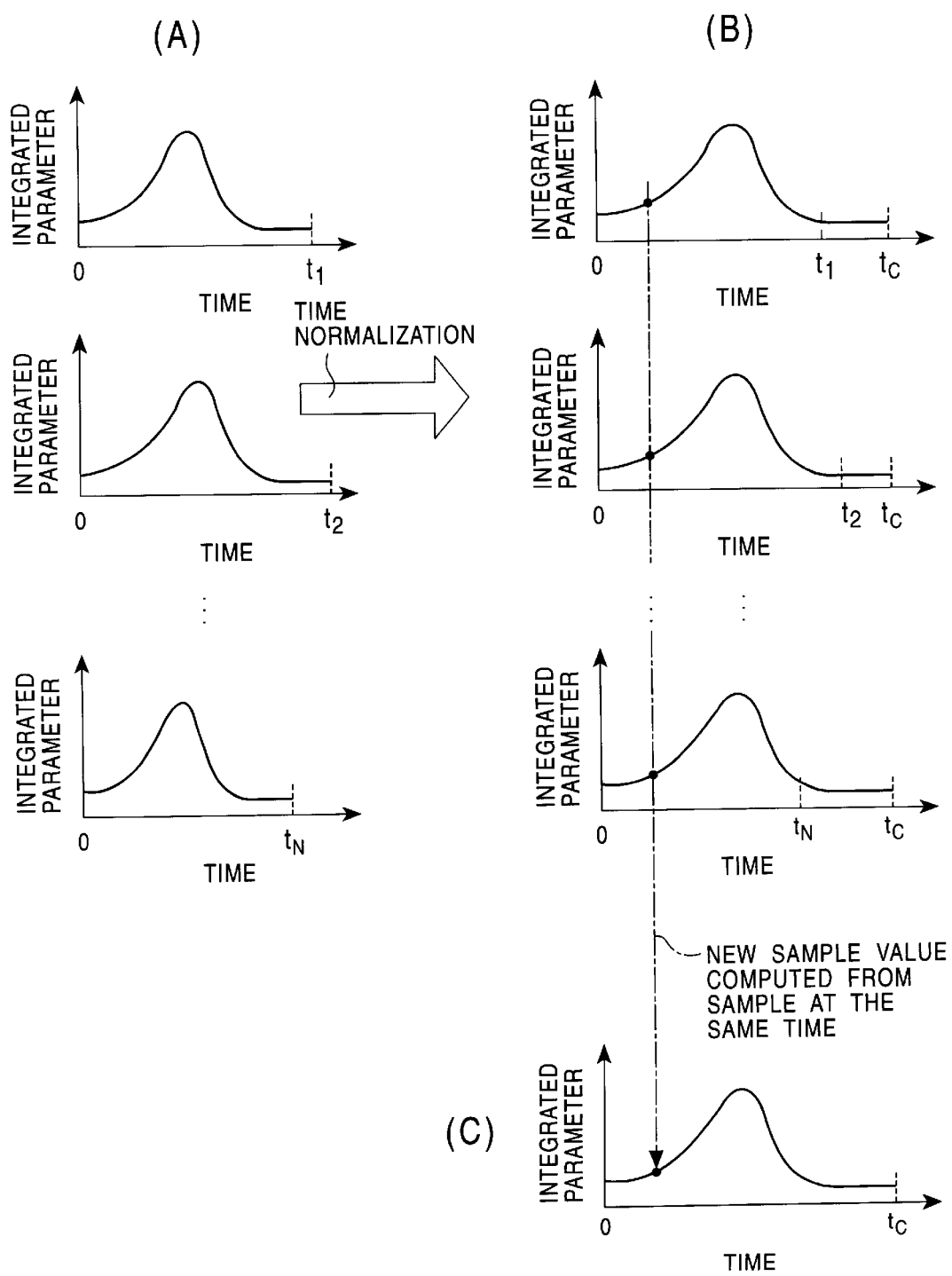
FIG. 10 is a drawing illustrating a process by the time-domain normalizer 71 shown in FIG. 9.
Figure 11:
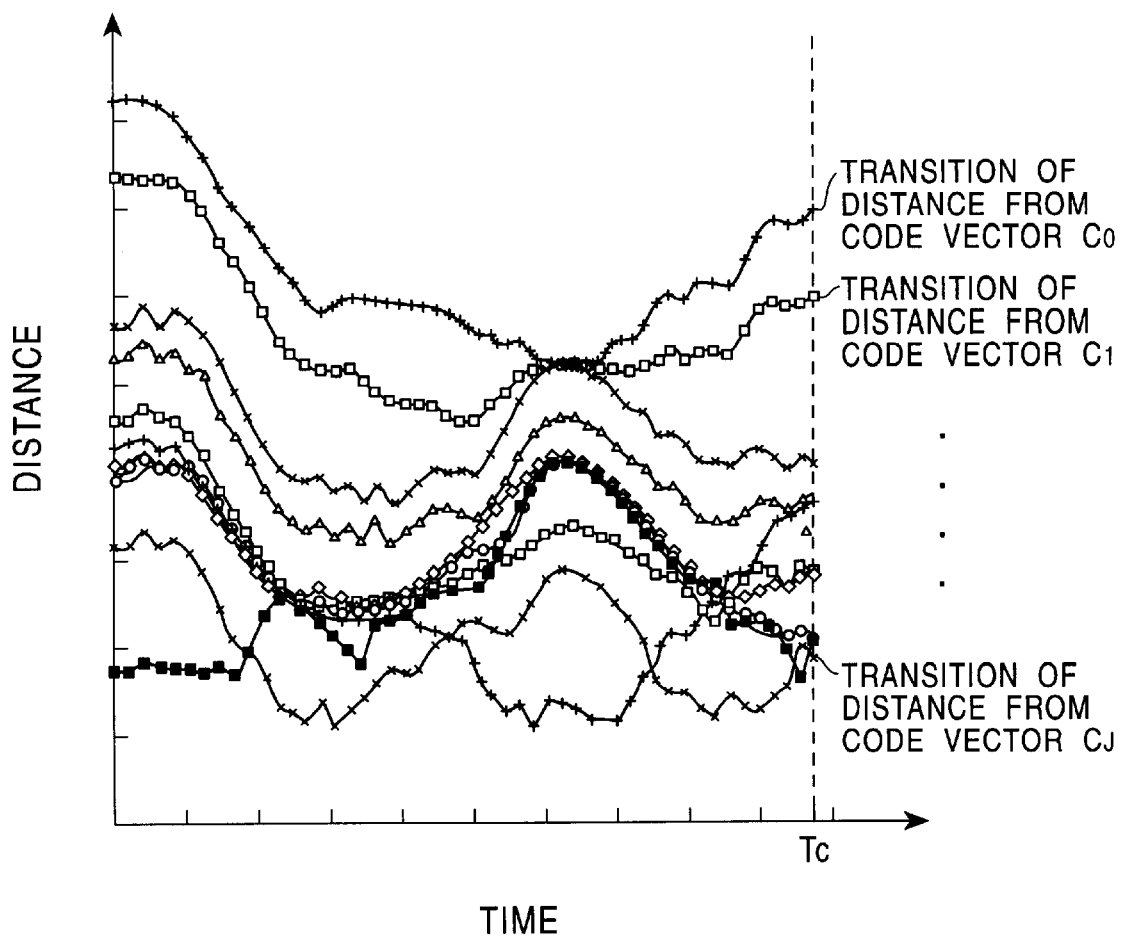
FIG. 11 is a graph showing distance transitions output by the distance calculator 72 shown in FIG. 9.
Figure 12:
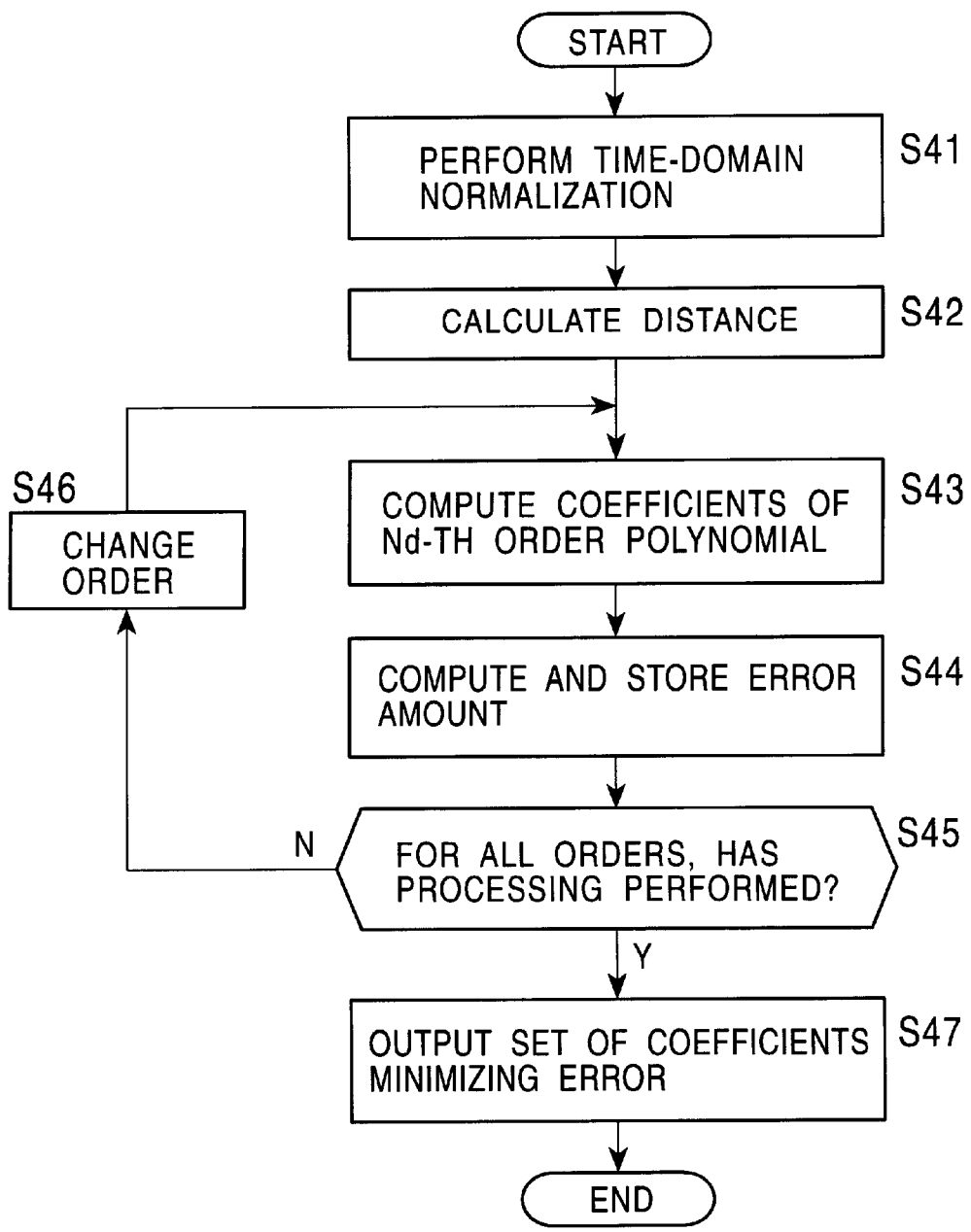
FIG. 12 is a flowchart illustrating a process by the learning apparatus shown in FIG. 9.
Figure 13:
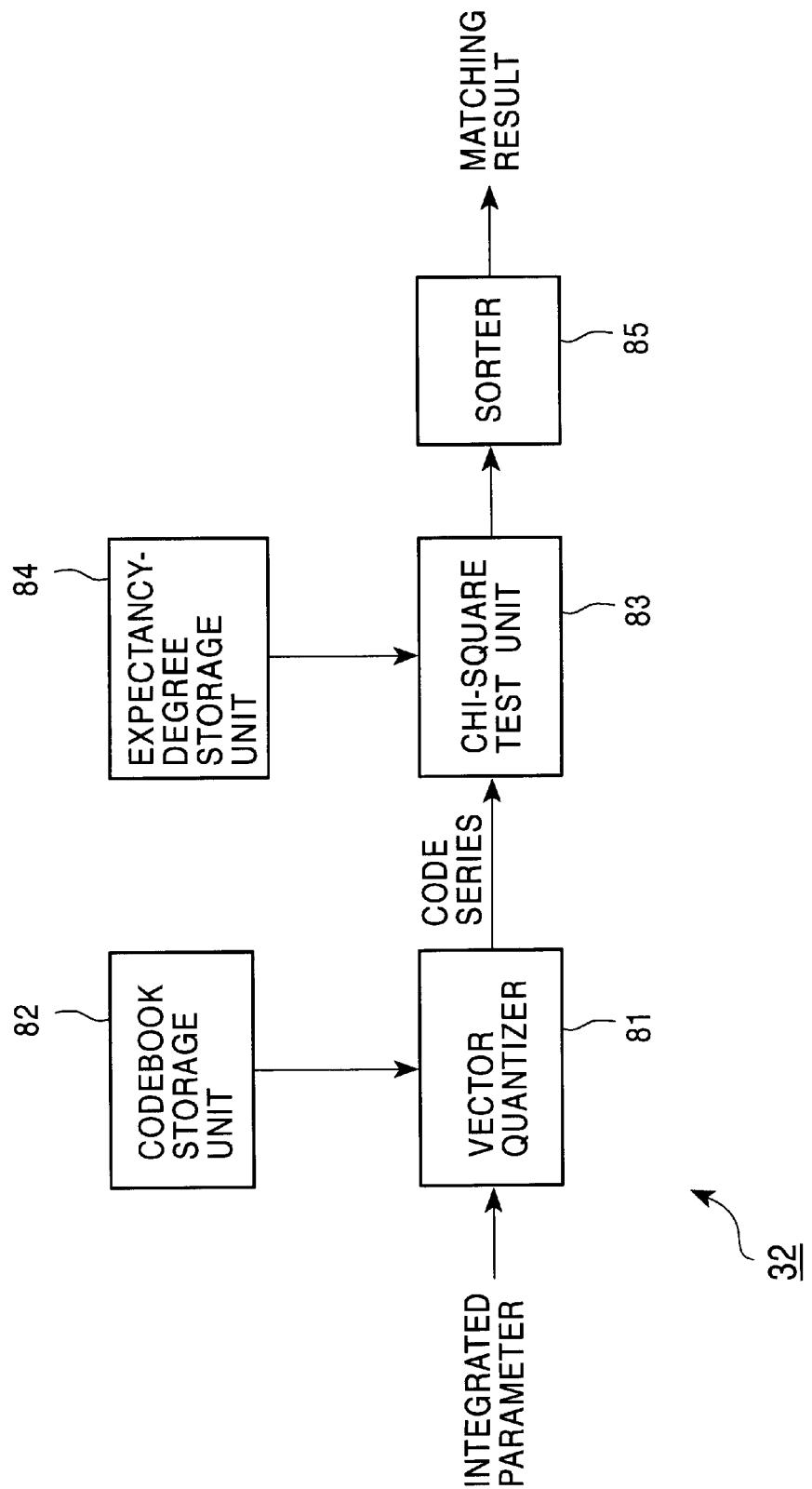
FIG. 13 is a block diagram showing an example of the spatial distribution matching unit 32 shown in FIG. 1.
Figure 14:
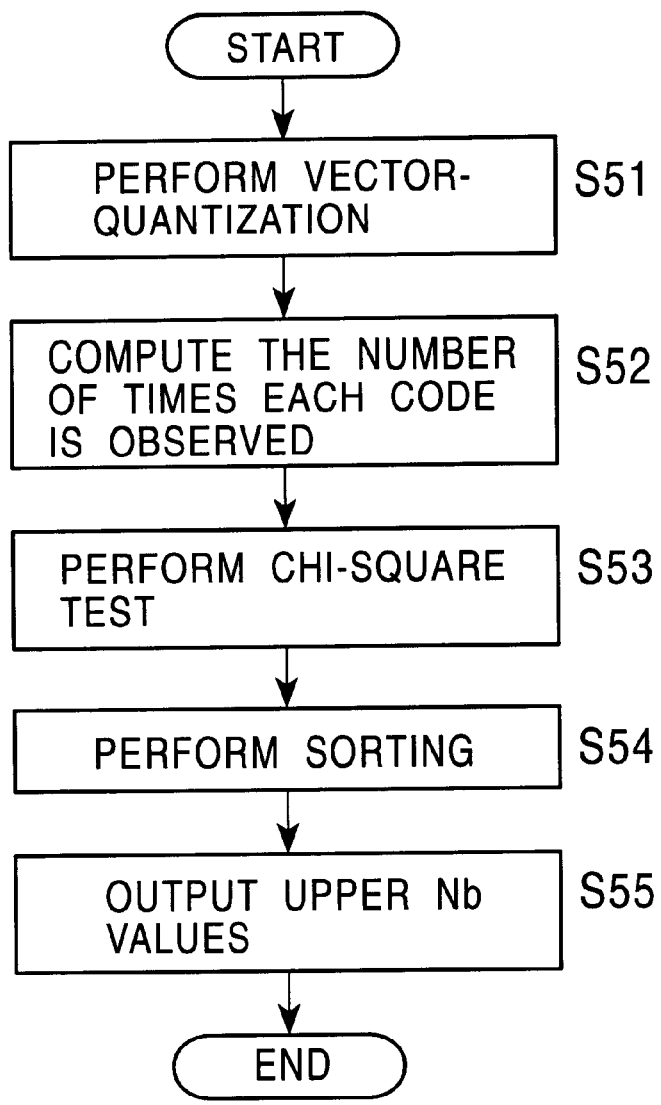
FIG. 14 is a flowchart illustrating a process by the spatial distribution matching unit 32 shown in FIG. 13.
Figure 15:
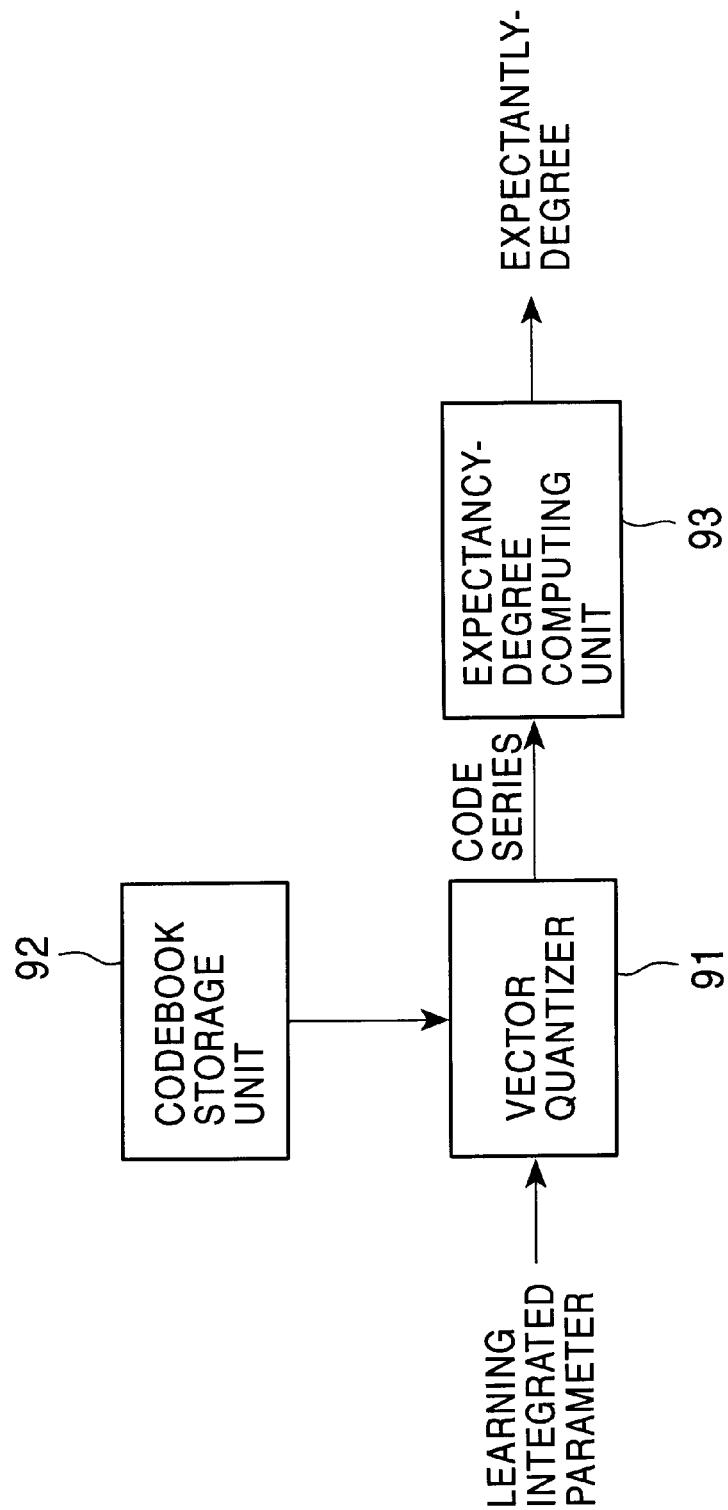
FIG. 15 is a block diagram showing an example of a learning apparatus that performs learning for finding expectancy degrees stored in the expectancy-degree storage unit 84 shown in FIG. 13.
Figure 16:
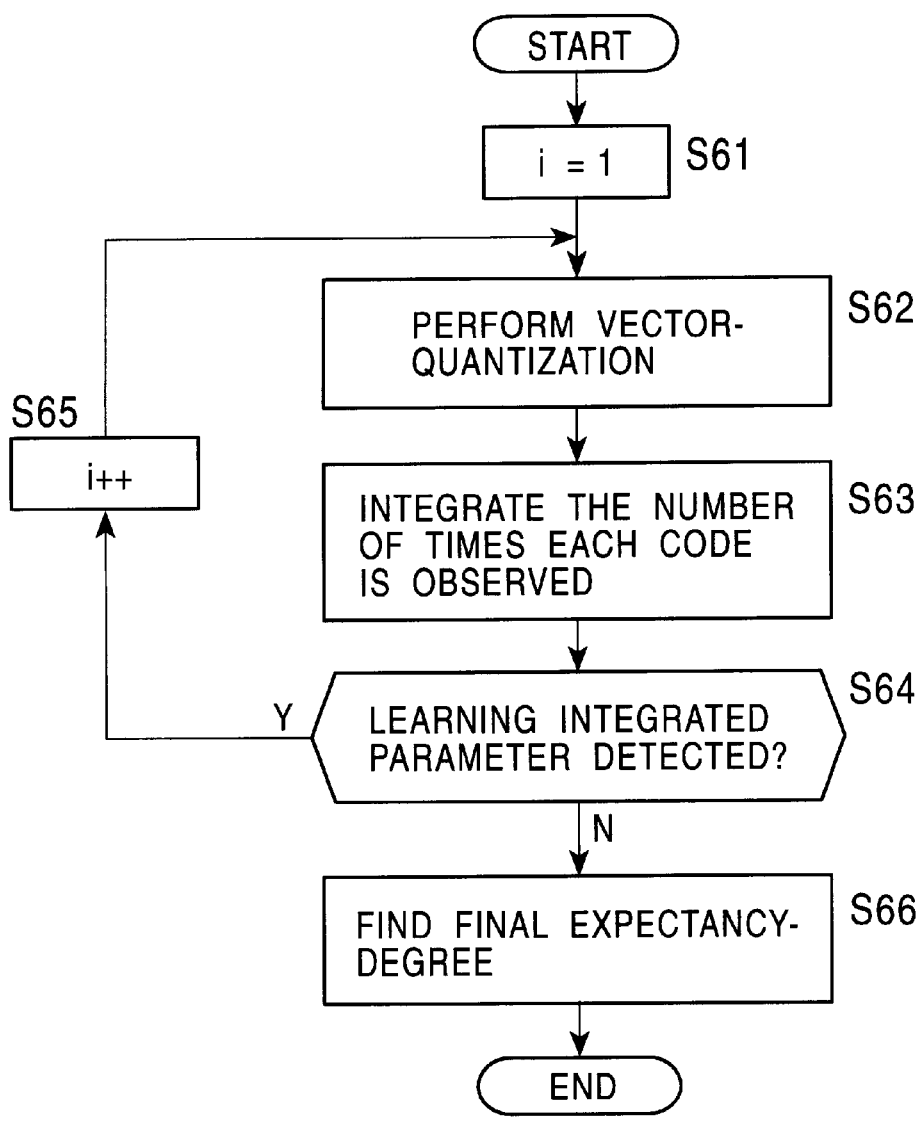
FIG. 16 is a flowchart illustrating a process by the learning apparatus shown in FIG. 15.
Figure 17:
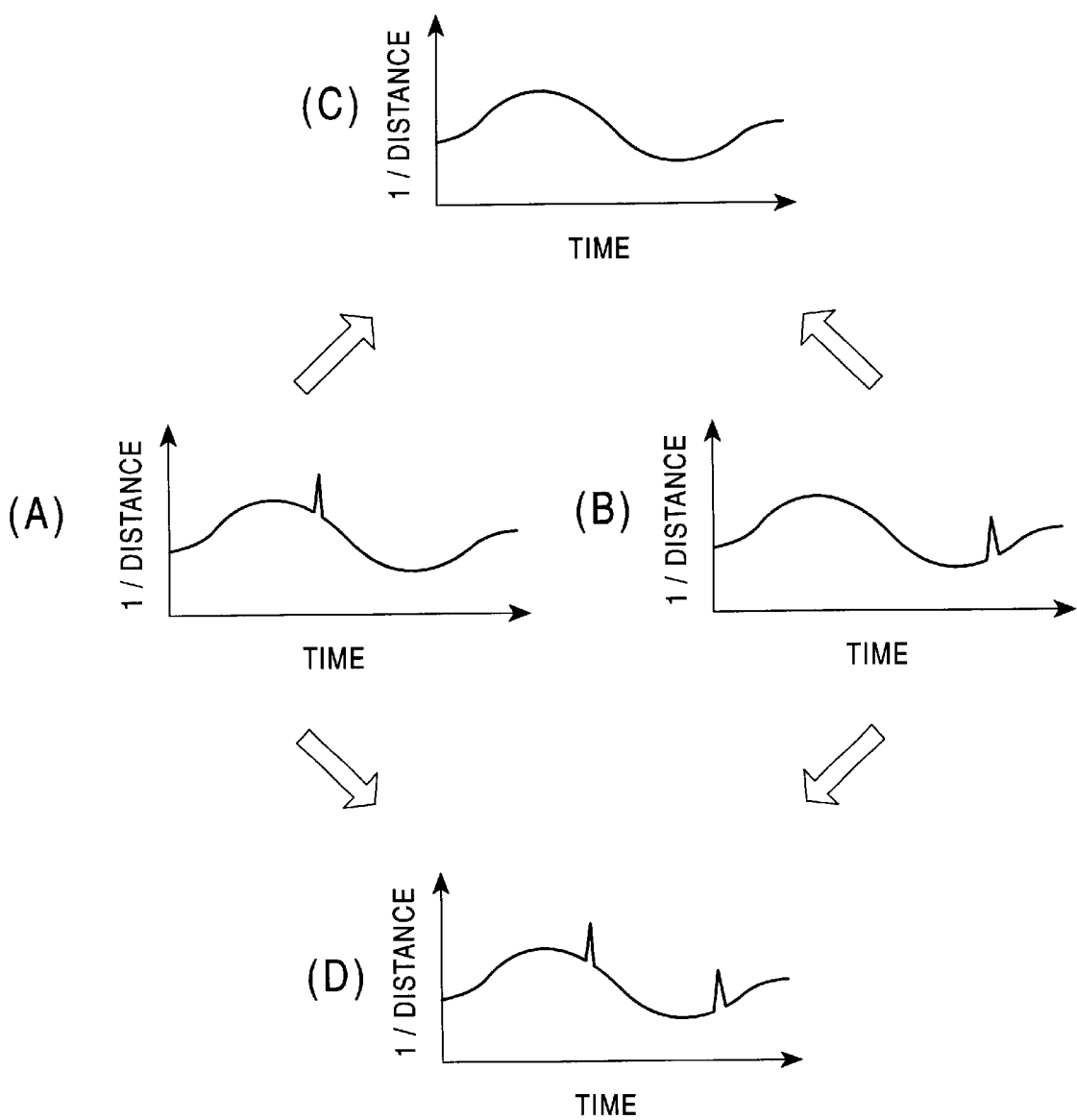
FIG. 17 is a drawing illustrating integrated parameters obtained by integrating image and speech feature parameters so that the characteristics of both types cannot be lost.

In other words, similarly to the distance-transition-model storage unit 62 shown in FIG. 5, the distance-transition-model storage unit 165 stores a distance-transition model as shown in FIG. 7. When, among the code series of the image and the speech output by the vector quantizer 162, codes at time t are respectively represented by $s_V(t)$ and $s_A(t)$ (t=0, 1, ..., $T_C$), the distance calculator 164 finds distances at time #0 to code vectors corresponding to codes $s_V(0)$ and SA(0), referring to the distance-transition model of the word to be learned. Specifically, when image code $s_V(0)$ corresponds to code vector $C_0$, in FIG. 7, the distance at time #0 on the curve indicating distance transition from code vector $C_0$ is found, and when image code $s_A(0)$ corresponds to code vector $C_1$, in FIG. 7, the distance at time #0 on the curve indicating distance transition from code vector $C_1$ is found.

The distance calculator 164 finds distances at time #1 to image code $s_V(1)$ and speech code $S_A(1)$ secondly output by the vector quantizer 162, referring to the distance-transition model. In other words, when image code $s_V(1)$ corresponds to code vector $C_0$, in FIG. 7, the distance at time #1 on the curve indicating distance transition from code vector $C_0$ is found. When speech code $s_A(1)$ corresponds to code vector $C_1$, in FIG. 7, the distance at time #1 on the curve indicating distance transition from code vector $C_1$.

Similarly, the distance calculator 164 sequentially finds, up to distances at $\#T_C$ to code vectors corresponding to image code $s_V(T_C)$ and speech code $s_A(T_C)$, referring to the distance-transition model, and outputs the obtained image- and speech-related distance series, that is, the distances at time #0 to $T_C$ for the image and the speech.

The image- and speech-related distance series are supplied to the optimal-normalization-coefficient determining unit 104 (shown in FIG. 18), as described above.

The matching unit 131 performs the above-described process on all the image and speech (time-series) feature parameters (for learning) on each word to be learned which are stored in the memory 166. Thereby, distance series for the image and the speech on each word to be learned are output.

Figure 22:
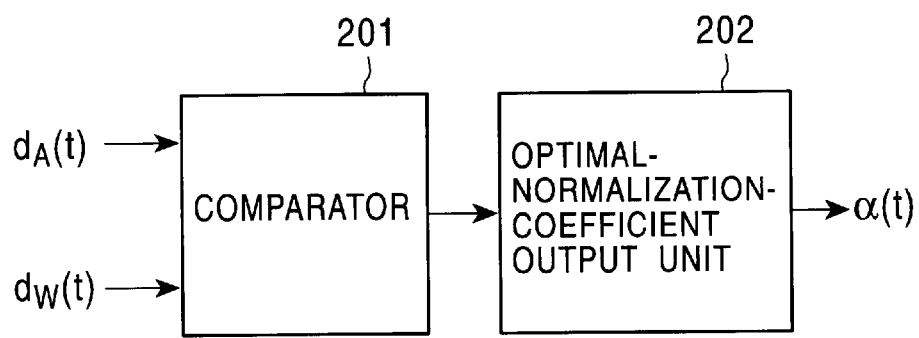
FIG. 22 is a block diagram showing an example of the optimal-normalization-coefficient determining unit 104.

With reference to FIG. 22, the optimal-normalization-coefficient determining unit 104 shown in FIG. 18 is described below.

As described above, image-related distance $d_V(t)$ and speech-related distance $d_A(t)$ at each time t on a word to be learned, output from the matching unit 131, are supplied to a comparator 201 (shown in FIG. 22). The comparator 201 compares image-related distance $d_V(t)$ and speech-related distance $d_A(t)$ at each time t, and supplies the comparing result to an optimal-normalization-coefficient output unit 202.

Based on the comparing result supplied from the comparator 201, the optimal-normalization-coefficient output unit 202 finds an optimal normalization coefficient at each time t for recognizing the word to be learned.

In other words, when the absolute $|d_V(t)-d_A(t)|$ value of the difference between image-related distance $d_V(t)$ and speech-related distance $d_A(t)$ is greater than threshold value $\epsilon$, that is, when there is a great difference between image-related distance $d_V(t)$ and speech-related distance $d_A(t)$, the optimal-normalization-coefficient output unit 202 outputs, as optimal normalization coefficient $\alpha(t)$, zero if image-related distance $d_V(t)$ is less than speech-related distance $d_A(t)$, and the infinite if speech-related distance $d_A(t)$ is less than image-related distance $d_V(t)$.

When the absolute $|d_V(t)-d_A(t)|$ value of the difference between image-related distance $d_V(t)$ and speech-related distance $d_A(t)$ is not more than threshold value $\epsilon$, that is, when image-related distance $d_V(t)$ and speech-related distance $d_A(t)$ are approximately equal to each other, the optimal-normalization-coefficient output unit 202 outputs learning normalization coefficient $\alpha$ as optimal normalization coefficient $\alpha(t)$. The optimal-normalization-coefficient output unit 202 receives normalization coefficient $\alpha$ from the intermedia normalizer 121 shown FIG. 18.

When image-related distance $d_V(t)$ is less, the image feature parameters have noticeable characteristics. Thus, by increasing the weights of the image feature parameters, the recognition factor can be increased. Similarly, when speech-related distance $d_A(t)$ is less, the speech feature parameters have noticeable characteristics. Thus, by increasing the weights of the speech feature parameters, the recognition factor can be increased. Accordingly, when image-related distance $d_V(t)$ is less, optimal normalization coefficient $\alpha(t)$ is set to be zero, and when speech-related distance $d_A(t)$ is less, optimal normalization coefficient $\alpha(t)$ is set to be infinite.

In other words, in this embodiment, normalization on image and speech feature parameters is performed by multiplying only the speech feature parameters by normalization coefficients, and the image feature parameters and the speech feature parameters multiplied by the normalization coefficients are used to generate integrated parameters, as described above. Therefore, when optimal normalization coefficient $\alpha(t)$ is zero, that is, when the image feature parameters have noticeable characteristics, the speech feature parameters are zero. As a result, the integrated parameters are substantially composed of only the image feature parameters having noticeable characteristics. When optimal normalization coefficient $\alpha(t)$ is infinite (when the speech feature parameters have noticeable characteristics), the speech feature parameters are extremely greater than the image feature parameters. As a result, the integrated parameters are substantially composed of only the speech feature parameters. The integrated parameters obtained when optimal normalization coefficient $\alpha(t)$ is infinite are generated such that actually the speech feature parameters are not multiplied by optimal normalization coefficient $\alpha(t)$ but the image feature parameters are set to be zero. The setting of optimal normalization coefficient $\alpha(t)$ to be infinite means the setting of the image feature parameters to be zero.

When image-related distance $d_V(t)$ and speech-related distance $d_A(t)$ are approximately equal to each other, both the image and speech feature parameters do not have particular noticeable characteristics. Thus, by setting the weights of the image and speech feature parameters to be equal, the recognition factor can be increased. Accordingly, in this case, optimal normalization coefficient $\alpha(t)$ is used as learning normalization coefficients, that is, the normalization coefficient $\alpha$ obtained by the learning apparatus shown in FIG. 3.

The optimal-normalization-coefficient output unit 202 outputs, at each time t, data string obtained by learning coefficients, zero, or the infinite, as optimal normalization coefficient $\alpha(t)$ for recognizing the word to be learned.

Figure 23:
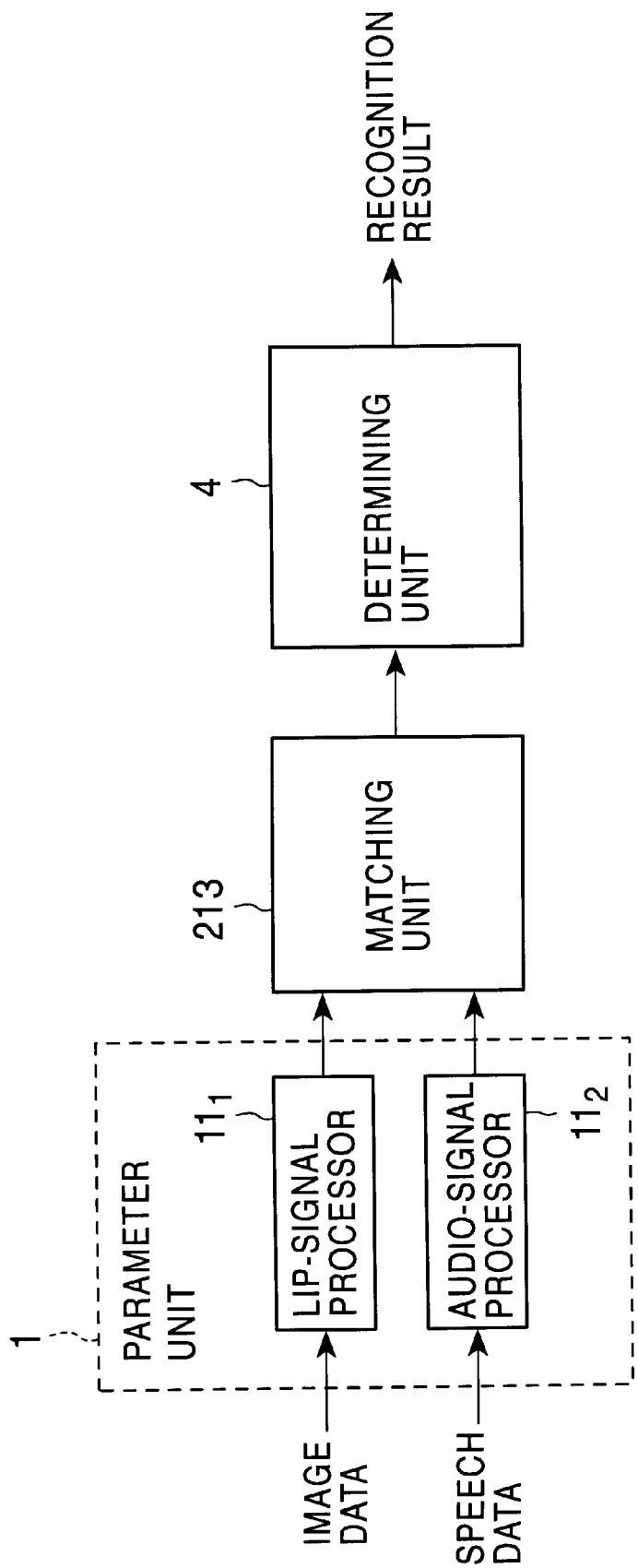
FIG. 23 is a block diagram showing a speech recognition apparatus according to an embodiment of the present invention.

With reference to FIG. 23, a speech recognition apparatus according to an embodiment of the present invention, which uses the above-described optimal normalization coefficient $\alpha(t)$ to perform speech recognition is described below. In FIG. 23, parts of the apparatus corresponding to those shown in FIG. 1 are denoted by identical reference numerals, and descriptions thereof are omitted below, as required. For brevity of description, it is assumed that only lip-image data and speech data are input, as described above. However, similarly to the apparatus shown in FIG. 1, other types of data can be input to the apparatus shown in FIG. 23.

As described using FIG. 1, speech data and lip-image data, obtained when the user pronounced a word, are supplied to a parameter unit 1. The parameter unit 1 extracts image and speech feature parameters from the supplied image and speech data, and supplies them to a matching unit 213. The matching unit 213 uses time-series optimal normalization coefficients to perform normalization on the image and speech feature parameters, and integrates the normalized feature parameters of both types to generate integrated parameters. The matching unit 213 performs, base on the integrated parameters, matching by the distance-transition method, and outputs the matching results to a determining unit 4. The determining unit 4 finds, based on the output from the matching unit 213, finds and outputs a result of recognition of the user's speech.

Figure 24:
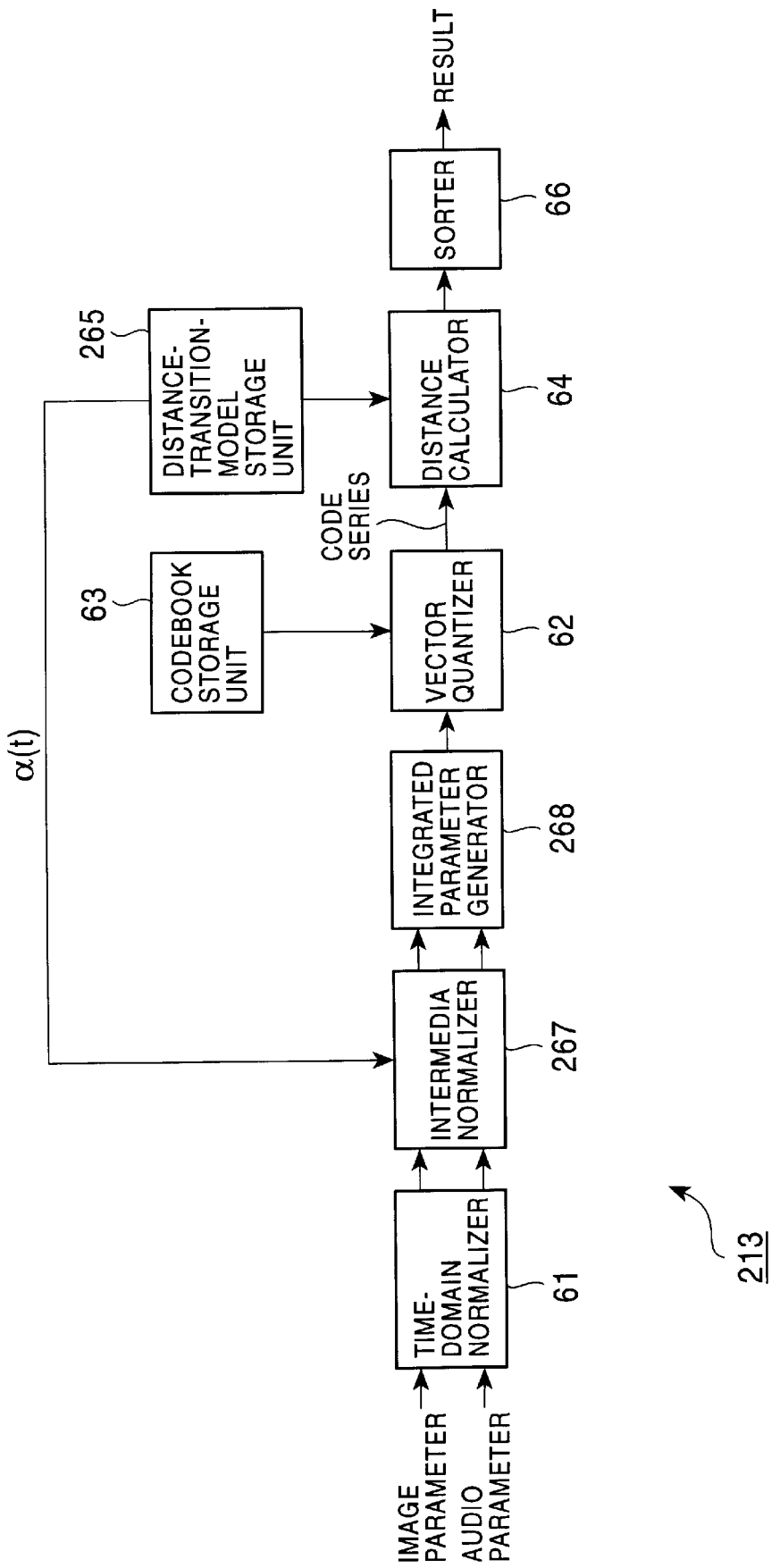
FIG. 24 is a block diagram showing an example of the matching unit 213 shown in FIG. 23.
Figure 25A:
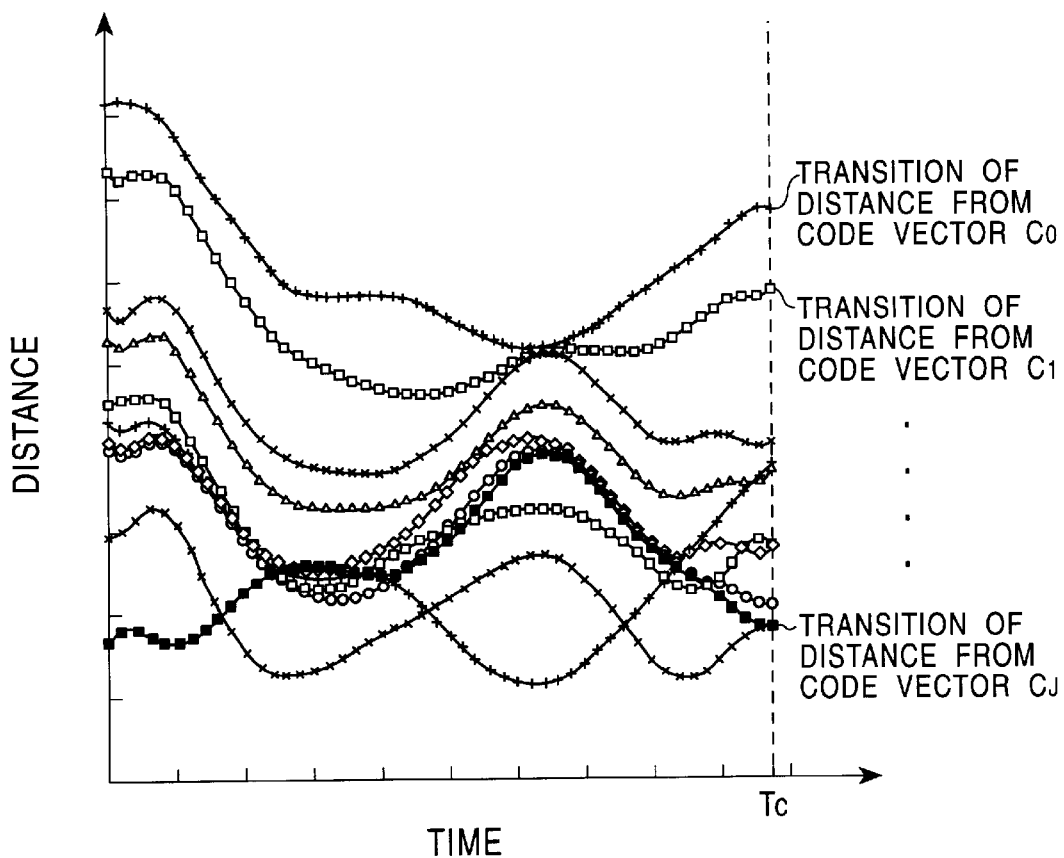
FIGS. 25A and 25B are graphs illustrating storage contents in the distance-transition-model storage unit 265 shown in FIG. 24.
Figure 25B:
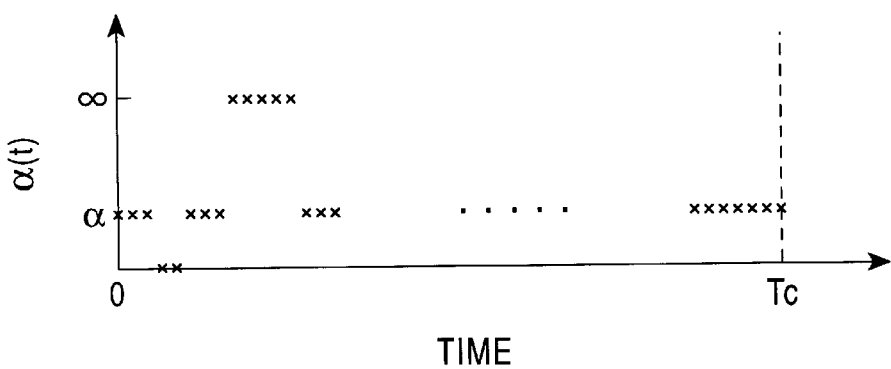

With reference to FIG. 24, an example of the matching unit 213 shown in FIG. 23 is described below. Parts of the matching unit 213 corresponding to those of the distance-transition matching unit 31 shown in FIG. 5 are denoted by identical reference numerals, and the descriptions thereof are omitted below, as required. In the matching unit 213, a distance-transition-model storage unit 265 is provided in place of the distance-transition-model storage unit 62 (shown in FIG. 5), and an intermedia normalizer 267 and an integrated parameter generator 268 are additionally provided between a time-domain normalizer 61 and a vector quantizer 62. The distance-transition-model storage unit 265 stores not only a distance-transition model (as shown in FIG. 7) of each word to be recognized, similarly to the distance-transition-model storage unit 62 (shown in FIG. 5), but also the values (obtained by the learning apparatus shown in FIG. 18) of optimal normalization coefficient $\alpha(t)$ at each time t (after time-domain normalization) for each word.

Figure 6A:
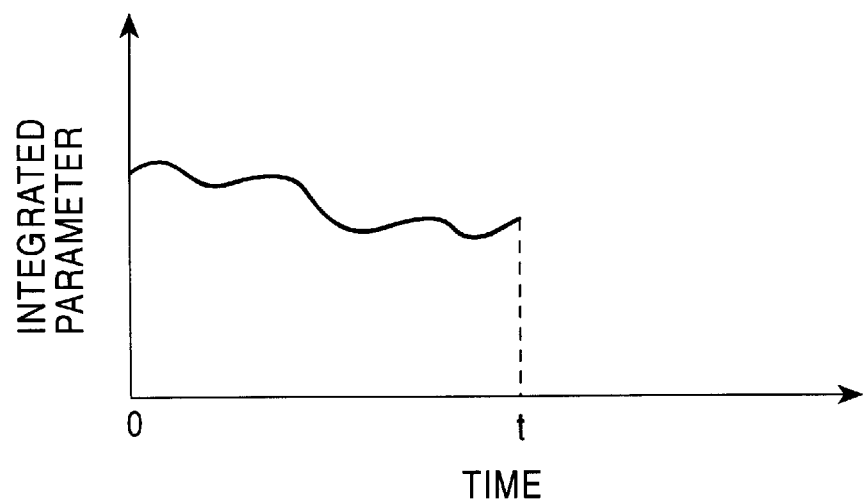
FIGS. 6A and 6B are graphs illustrating a process by the time-domain normalizer 61 shown in FIG. 5.
Figure 6B:
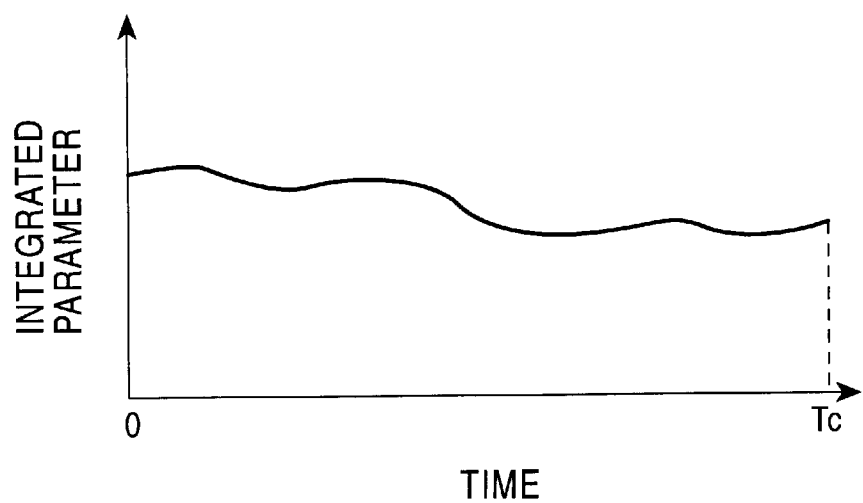

The intermedia normalizer 267 normalizes the image and speech feature parameters at each time output from the time-domain normalizer 61, using optimal normalization coefficient $\alpha(t)$ stored in the distance-transition model 265, and supplies the normalized feature parameters to the integrated parameter generator 268. In other words, the time-domain normalizer 61 is supplied with the time-series image and speech feature parameters output by the parameter unit 1 shown in FIG. 23, and the time-domain normalizer 61 performs the time-domain normalization described using FIG. 6. The time-domain-normalized feature parameters of both types are supplied to the intermedia normalizer 267. The intermedia normalizer 267 normalizes the time-domain-normalized image and speech feature parameters at each time, using the values of optimal normalization coefficient $\alpha(t)$ (at each corresponding time) stored in the distance-transition-model storage unit 265, and supplies the intermedia-normalized image and speech parameters to the integrated parameter generator 268.

The integrated parameter generator 268 generates integrated parameters by integrating the intermedia-normalized image and speech parameters supplied from the intermedia normalizer 267, and outputs them to a vector quantizer 62.

Figure 26:
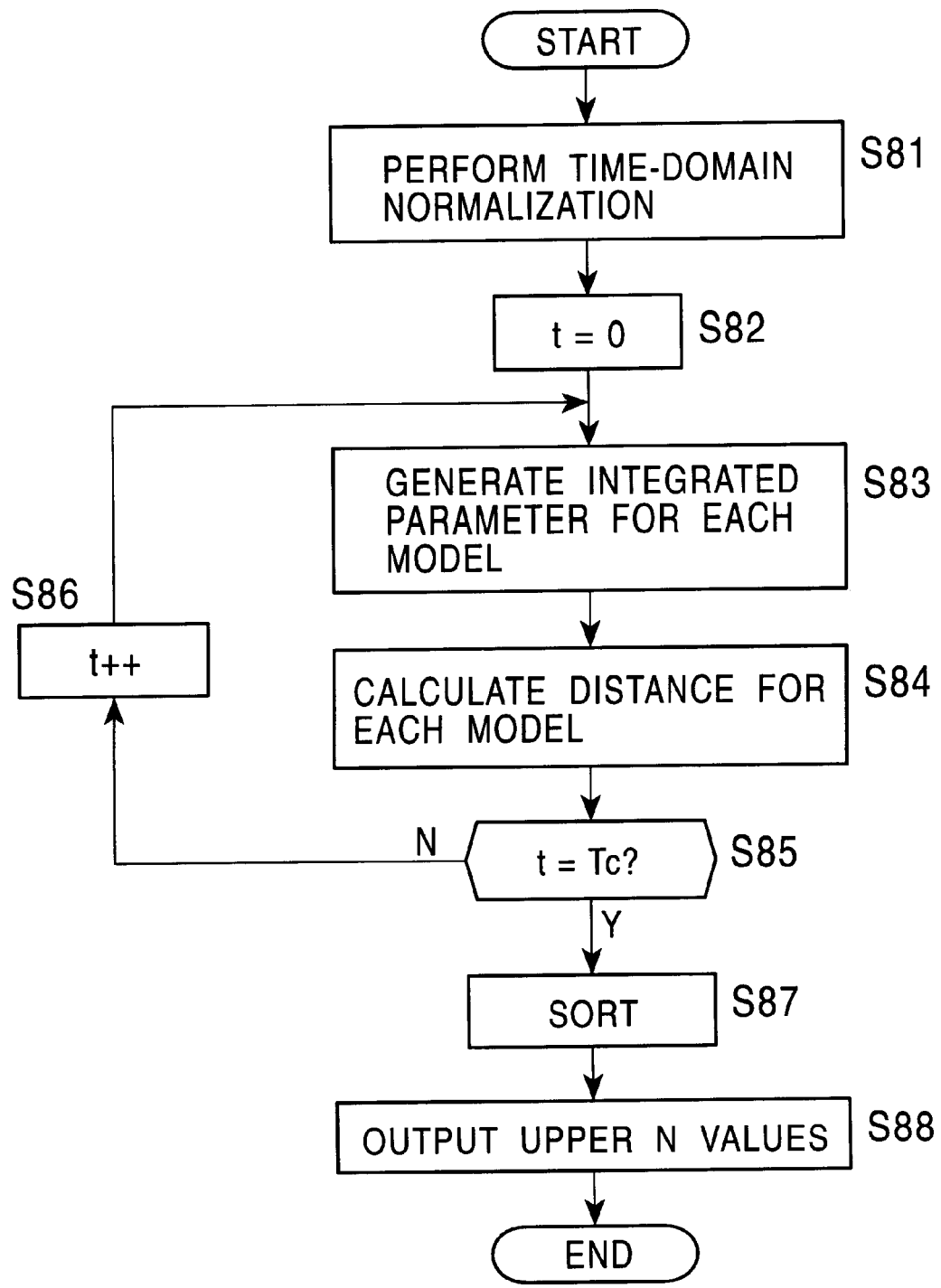
FIG. 26 is a flowchart illustrating a process by the matching unit 213 shown in FIG. 24.

With reference to the flowchart shown in FIG. 26, a process by the matching unit 213 shown in FIG. 24 is described below.

The image and speech feature parameters from the parameter unit 1 (shown in FIG. 23) are supplied to the time-domain normalizer 61 (shown in FIG. 24) when the user pronounces a word.

In step S81, the time-domain normalizer 61 performs time-domain normalization on the image and speech feature parameters, and supplies the time-domain-normalized feature parameters to the intermedia normalizer 267.

In step S82, variable t for measuring each time after the time-domain normalization is initialized into zero, and the process proceeds to step S83.

In step S83, the intermedia normalizer 267 uses optimal normalization coefficients at time t to normalize the time-domain-normalized image and speech feature parameters at time t. In other words, the intermedia normalizer 267 multiplies the speech feature parameters at time t by optimal normalization coefficient $\alpha(t)$ at time t on each distance-transition model stored in the distance-transition-model storage unit 265, and outputs the products to the integrated parameter generator 268, together with the image feature parameters at time t.

The integrated parameter generator 268 integrates the output image and speech parameters from the intermedia normalizer 267 to generate integrated parameters, and supplies them to the vector quantizer 62. In other words, from the intermedia normalizer 267, the image and speech feature parameters normalized by optimal normalization coefficient $\alpha(t)$ at time t for each distance-transition model are output. Therefore, the integrated parameter generator 268 generates and supplies the integrated parameters for each distance-transition model (composed of the image and speech feature parameters normalized by optimal normalization coefficient $\alpha(t)$ stored with each distance-transition model) to the vector quantizer 62.

The vector quantizer 62 performs vector-quantization on the integrated parameters for each distance-transition model from the integrated parameter generator 268, using the codebook stored in the codebook storage unit 63, and outputs codes as the vector-quantization results. The codes for each distance-transition model are supplied to a distance calculator 64.

The distance calculator 64 finds a distance between each code for each distance-transition model (from the vector quantizer 62) and each code vector observed at time t in each distance-transition model, and accumulatively adds it to the distance for each already obtained distance-transition model.

In step S85, the process determines whether time t is equal to end time $T_C$ after the time-domain normalization. If the process has determined that time t is not equal to end time $T_C$ after the time-domain normalization, the process proceeds to step S86, and time t is incremented by 1. After that, the process returns to step S83, and the same processing is performed on the incremented time t.

If the process has determined that time t is equal to end time $T_C$ after the time-domain normalization, the distance calculator 64 outputs, to a sorter 66, each accumulated value of distances for each distance-transition model, which is stored in the distance-transition-model storage unit 256, and the process proceeds to step S87.

In step S87, the sorter 66 selects upper N values in increasing order from among accumulated values of distances for the distance-transition models of each word to be recognized, and the process proceeds to step S88.

In step S88, the sorter 66 outputs the results of matching between the integrated parameters and the distance-transition models to the determining unit 4 (shown in FIG. 23), and the process terminates.

As described above, using optimal normalization coefficient $\alpha(t)$ based on which noticeable characteristics of image and speech parameters are reflected at each time t by integrated parameters, the image and speech feature parameters are normalized to generate the integrated parameters. Accordingly, the speech recognition factor can be increased.

Although the speech recognition apparatuses to which the present invention is applied have been described, the present invention may be applied to apparatuses for recognizing a speaker, images, etc.

In the foregoing embodiments, for brevity of description, optimal normalization coefficient $\alpha(t)$ for two types of feature parameters, an image and speech, is found. However, time-series optimal normalization coefficients for three or more types of feature parameters or for media other than the image and the speech can be found.

Because the method of learning time-series optimal normalization coefficients is not dependent on the type and order of feature parameters, similarly to fixed normalization coefficient learning, the method may be applied irrespective of the type and order of feature parameters.

In the foregoing embodiments, time-series optimal normalization coefficient $\alpha(t)$ by which speech feature parameters are multiplied is found. However, time-series optimal normalization coefficients by which both image and speech feature parameters are multiplied may be found.

In the learning apparatus (shown in FIG. 18) that learns time-series optimal normalization coefficients, the matching unit 131 performs matching by the distance-transition method. However, the matching technique is not limited to that described above.

In the speech recognition apparatus (shown in FIG. 23) that uses time-series optimal normalization coefficients to perform speech recognition, the matching unit 213, performs matching by only the distance-transition method. However, the matching unit 213 may perform, for example, matching by the spatial distribution method, together with the matching by the distance-transition method, similarly to the apparatus shown in FIG. 1. In this case, also in the matching by the spatial distribution method, integrated parameters obtained using time-series optimal normalization coefficients can be used.

In the learning apparatus shown in FIG. 18, each time t, one of zero, the infinite, and learning normalization coefficient $\alpha$ is output as optimal normalization coefficient $\alpha(t)$. However, the values of optimal normalization coefficient $\alpha(t)$ are not limited to the three values. In other words, by preparing not only fixed normalization coefficient $\alpha$ obtained by the learning apparatus (shown in FIG. 3) but also various normalization coefficients $\alpha_0, \alpha_1, \alpha_2, \ldots, \alpha_N$, as learning coefficients, and generating integrated parameters by the intermedia normalizer 121 (shown in FIG. 18) by integrating the image and speech feature parameters with normalization coefficients $\alpha_0, \alpha_1, \alpha_2, \ldots, \alpha_N$, a normalization coefficient having the least distance to a word to be learned, among normalization coefficients $\alpha_0, \alpha_1, \alpha_2, \ldots, \alpha_N$, can be used as optimal normalization coefficient $\alpha(t)$. This requires time for learning optimal normalization coefficient $\alpha(t)$, but the time require for recognition is not affected. Therefore, only the time for learning is increased. However, the increase in only the learning time is not a particular problem in speech recognition.

According to the foregoing embodiments of the present invention, feature parameters from a plurality of input data are normalized based on learning normalization coefficients, and distances from each of the normalized feature parameters and to a normal parameter are calculated. Based on the calculated distances, time-series normalization coefficients for performing speech recognition are determined for the feature parameters. Therefore, optimal normalization coefficients for recognizing the feature parameters at each point of time can be obtained.

According to the foregoing embodiments of the present invention, feature parameters from a plurality of input data are normalized based on time-series normalization coefficients for recognition, and the normalized feature parameters are integrated to generate integrated parameters. Based on the integrated parameters, recognition of an object to be recognized is performed. Therefore, the recognition factor can be increased.

What is claimed is:

1. An information processing apparatus comprising:
   a feature parameter detector for detecting feature parameters based on a plurality of different types of input data, each of said different types of input data being obtained independently, at least one detected feature parameter being associated with each of said different types of input data;
   a storage unit for storing normalization information;
   a normalizer for normalizing the feature parameters detected by said feature parameter detector associated with said different types of input data, using the normalization information stored in said storage unit, and
   an integration unit for integrating the feature parameters normalized by the normalizer,
   wherein said normalization information in said storage unit is obtained by detecting distances between a normal parameter and each of normalized feature parameters associated with the different types of learning data; and
   comparating the detected distances associated with said different types of learning data.

2. An information processing apparatus according to claim 1, further comprising a recognition unit for recognizing that at least one of said plurality of different types of input data corresponds or does not correspond to an object to be recognized.

3. An information processing apparatus according to claim 2, wherein said recognition unit comprises:
   a vector quantizer for performing time-series vector-quantization on outputs from said integration unit;
   a distance-transition-model storage unit for storing a plurality of distance-transition models; and
   a matching unit for performing matching based on distances between the outputs from said integration unit and each distance-transition model.

4. An information processing apparatus according to claim 1, wherein said feature parameter detector detects time-series feature parameters.

5. An information processing apparatus according to claim 4, further comprising a normalization-information storage unit for storing time-series normalization information corresponding to the feature parameters, wherein said normalizer normalizes the feature parameters, based on the normalization information.

6. An information processing apparatus according to claim 5, wherein the normalization information is generated based on the feature parameters by performing learning beforehand.

7. An information processing apparatus according to claim 1, wherein said normalizer comprises:
   a first normalizer for performing time-domain normalization on the feature parameters; and
   a second normalizer for normalizing the feature parameters normalized by said first normalizer while maintaining the characteristics of the feature parameters.

8. An information processing apparatus according to claim 1, wherein said normalizer normalizes each of the feature parameters, based on time-series normalization information preset based on relationships among the feature parameters.

9. A learning apparatus comprising:
   a normalizer for normalizing, based on first normalization information preset for a plurality of different types of time-series input data, each of said different types of input data being obtained independently, feature parameters of the different types of input data, at least one feature parameter being associated with each of said different types of input data;
   a detector for detecting a distance between a normal parameter and each of the normalized feature parameters associated with said different types of input data;
   a comparator for comparing the detected distances associated with said different types of input data and for outputting the result of the comparation, and
   a normalization information generator for generating, based on the result of the comparation, second normalization information for each of the feature parameters.

10. A learning apparatus according to claim 9, wherein the first normalization information is set to be a value for setting the distance between one of the feature parameters and the normal parameter to be equal to the distance between another one of the feature parameters and the normal parameter.

11. A learning apparatus according to claim 10, wherein said normalization information generator generates the second time-series normalization information by providing a larger weight to one parameter having a shorter distance at each point of time.

12. A learning apparatus comprising:
   a feature parameter detector for detecting feature parameters based on a plurality of different types of input data, each of said different types of input data being obtained independently, at least one detected feature parameter being associated with each of said different types of input data;
   a first normalizer for normalizing the feature parameters detected by the feature parameter detector associated with said different types of input data among the feature parameters;
   a second normalizer for normalizing the feature parameters normalized by the first normalizer based on the order thereof;
   a matching unit for detecting distances between a normal parameter and each of the normalized feature parameters, normalized by said second normalizer, associated with said different types of input data;
   a comparator for comparing the detected distances associated with said different types of input data and for outputting the result of the comparison, and
   a normalization-information generator for generating normalization information based on the result of the comparison.

13. A learning apparatus according to claim 12, wherein said first normalizer performs normalization based on normalization information preset for the feature parameters among the feature parameters.

14. An information processing method comprising the steps of:
   detecting feature parameters based on a plurality of different types of input data, each of said different types of input data being obtained independently, at least one detected feature parameter being associated with each of said different types of input data;
   normalizing the detected feature parameters using normalization information; and
   integrating the normalized feature parameters
   wherein said normalization information is previously obtained by detecting distances between a normal parameter and each of normalized feature parameters associated with the different types of learning data; and comparing the detected distances associated with said different types of learning data.

15. An information processing method according to claim 14, further comprising the step of recognizing, based on outputs from the integrating step, that at least one of the input data corresponds or does not correspond to an object be recognized.

16. A learning method comprising the steps of:
   normalizing, based on first normalization information preset for a plurality of time-series input data, feature parameters of the different types of input data, each of said different types of input data being obtained independently, at least one feature parameter being associated with each of said different types of input data;
   detecting a distance between a normal parameter and each of the normalized feature parameters associated with said different types of input data;
   comparating the detected distances associated with said different types of input data and for outputting the result of the comparison; and
   generating, based on the result of the comparison, second normalization information for each of the feature parameters.

17. A learning method comprising the steps of:
   detecting feature parameters based on a plurality of, different types of input data, each of said different types of input data being obtained independently, at least one detected feature parameter being associated with each of said different types of input data;
   normalizing the detected feature parameters among the feature parameters associated with said different types of input data;
   further normalizing the normalized feature parameters normalized based on the order thereof;
   detecting distances between a normal parameter and each of the normalized feature parameters, normalized by said second normalizer, associated with said different types of input data;
   comparating the detected distances associated with said different types of input data, performing a matching process on each of the further normalized feature parameters; and
   generating, based on the result of the comparating, normalization information for each of the feature parameters.

* * * * *